(12) United States Patent
Schneider

(10) Patent No.: US 9,908,714 B2
(45) Date of Patent: Mar. 6, 2018

(54) SYSTEM AND METHOD FOR PROCESSING OF OPTICAL LENSES

(71) Applicant: Schneider GmbH & Co. KG, Fronhausen (DE)

(72) Inventor: Gunter Schneider, Marbug (DE)

(73) Assignee: Schneider GmbH & Co. KG, Fronhausen (DE)

( * ) Notice: Subject to any disclaimer, the term of this patent is extended or adjusted under 35 U.S.C. 154(b) by 311 days.

(21) Appl. No.: 14/383,987

(22) PCT Filed: Mar. 8, 2013

(86) PCT No.: PCT/EP2013/000693
§ 371 (c)(1),
(2) Date: Sep. 9, 2014

(87) PCT Pub. No.: WO2013/131656
PCT Pub. Date: Sep. 12, 2013

(65) Prior Publication Data
US 2015/0053530 A1    Feb. 26, 2015

(30) Foreign Application Priority Data

Mar. 9, 2012  (EP) ..................... 12001640
May 9, 2012  (EP) ..................... 12003626
(Continued)

(51) Int. Cl.
*B65G 37/02*        (2006.01)
*B29D 11/00*        (2006.01)
(Continued)

(52) U.S. Cl.
CPC .......... *B65G 37/02* (2013.01); *B24B 13/0031* (2013.01); *B24B 13/0037* (2013.01);
(Continued)

(58) Field of Classification Search
CPC .. B65G 37/02; B65G 43/10; B29D 11/00423; B29D 11/00432; B29D 11/00259;
(Continued)

(56) References Cited

U.S. PATENT DOCUMENTS 4,544,318 A   10/1985  Nagatomo et al.
4,727,684 A    3/1988  Kobayashi et al.
(Continued)

FOREIGN PATENT DOCUMENTS

DE   41 07 084 A1    9/1991
DE   198 15 728 A1   10/1999
(Continued)

*Primary Examiner* — Leslie A Nicholson, III
*Assistant Examiner* — Keith R Campbell
(74) *Attorney, Agent, or Firm* — David S. Safran

(57) ABSTRACT

A system and a method for processing of optical lenses in which the processing takes place using different processing apparatus between which there is a respective transfer apparatus. The transfer apparatus are used both for longitudinal and also cross conveyance. Each processing apparatus has its own conveyor apparatus which is controlled by the processing apparatus itself. The transfer apparatus are controlled by a central transfer control.

36 Claims, 9 Drawing Sheets

(30) Foreign Application Priority Data

May 16, 2012 (EP) .................................... 12003858
Dec. 6, 2012 (DE) .................... 20 2012 011 690 U

(51) Int. Cl.
- *B65G 43/10* (2006.01)
- *B24B 13/00* (2006.01)
- *B24B 27/00* (2006.01)

(52) U.S. Cl.
CPC ...... *B24B 27/0023* (2013.01); *B24B 27/0069* (2013.01); *B29D 11/0023* (2013.01); *B29D 11/00423* (2013.01); *B29D 11/00432* (2013.01); *B65G 43/10* (2013.01)

(58) Field of Classification Search
CPC ............ B29D 11/0023; B24B 13/0031; B24B 13/0037; B24B 27/0069; B24B 27/0023
USPC ........................................ 198/346.2; 700/230
See application file for complete search history.

(56) References Cited

U.S. PATENT DOCUMENTS

| | | | |
|---|---|---|---|
| 5,024,315 A | 6/1991 | Ward | |
| 5,372,241 A | 12/1994 | Matsumoto | |
| 5,555,504 A | 9/1996 | Lepper et al. | |
| 5,744,357 A * | 4/1998 | Wang | B29C 33/34 264/1.1 |
| 5,804,107 A * | 9/1998 | Martin | B29C 31/00 264/1.36 |
| 5,884,746 A * | 3/1999 | Leisner | B65G 37/02 198/346.1 |
| 5,947,259 A * | 9/1999 | Leisner | B65G 21/12 198/465.3 |
| 6,039,899 A | 3/2000 | Martin et al. | |
| 6,071,440 A | 6/2000 | Wang et al. | |
| 6,336,546 B1 * | 1/2002 | Lorenz | H01L 21/67727 198/346.2 |
| 6,439,870 B1 | 8/2002 | Marceau et al. | |
| 6,654,663 B1 * | 11/2003 | Jokela | B23P 19/001 198/358 |
| 6,716,294 B1 | 4/2004 | Vetrini | |
| 6,854,583 B1 * | 2/2005 | Horn | B65G 49/064 198/346.2 |
| 7,090,559 B2 | 8/2006 | Vulich et al. | |
| 7,801,641 B2 * | 9/2010 | Yoshikawa | B65G 37/02 414/222.01 |
| 8,397,898 B2 | 3/2013 | Buchmann et al. | |

FOREIGN PATENT DOCUMENTS

| | | | |
|---|---|---|---|
| DE | 10 2004 021 696 A1 | 11/2005 | |
| DE | 10 2007 059 303 A1 | 6/2009 | |
| DE | 102007059303 A1 * | 6/2009 | ............ B65G 37/02 |
| DE | 102007059303 A1 * | 6/2009 | ............ B65G 37/02 |
| EP | 1 288 758 A2 | 3/2003 | |
| EP | 2 489 468 A2 | 8/2012 | |
| GB | 1 567 587 A | 5/1980 | |
| WO | 02/087861 A2 | 11/2002 | |
| WO | 2008/042277 A1 | 4/2008 | |
| WO | 2010/012364 A1 | 2/2010 | |

* cited by examiner

SYSTEM AND METHOD FOR PROCESSING OF OPTICAL LENSES

BACKGROUND OF THE INVENTION

Field of the Invention

This invention relates to a system and method for processing of optical lenses.

Description of Related

The processing/machining of optical lenses takes place in several steps or in several separate processing apparatus. The processing/machining can comprise especially forming or cutting, polishing, coating, testing and measuring, marking, coating and/or cleaning.

Use of transfer systems for the transport of workpieces, especially of work holding-fixtures with the workpieces, to and from processing apparatus, is fundamentally known.

International Patent Application Publication WO 2008/042277 A1 discloses a system for processing of optical lenses, the system having different processing apparatus and a transfer system between the processing apparatus. A processing line for serial processing is formed. The lenses are therefore conveyed from one processing apparatus to the next processing apparatus until the lenses have passed through all processing apparatus. The processing apparatus and the transfer system with conveyor apparatus are controlled by a central computer or controller.

German Patent Application DE 41 07 084 A1 and corresponding U.S. Pat. No. 5,372,241 disclose an automatic conveyor system for transport of objects between production areas which each consist of one or more production stations of the same type and which are arranged with predetermined distances in two parallel rows. Furthermore, between the two parallel rows there is another conveyor apparatus for transport of objects between production areas remote from one another. In addition, between the individual production stations, there is another conveyor apparatus with a driverless shunting carriage with an assigned loading robot. The transfer system and the conveyor apparatus are controlled by a central control computer.

British Patent Application GB 1 567 587 A discloses a transfer system for workpieces in order to convey them alternately to two independently working processing apparatus by means of endless conveyor belts.

U.S. Pat. Nos. 6,039,899 and 6,071,440 disclose a system for casting and hardening of contact lenses. Pallets with front mold halves and pallets with rear mold halves are conveyed by separate belt conveyor apparatus to a transfer apparatus which transfers the pallets in alternation in the desired sequence to another belt conveyor apparatus.

International Patent Application Publication WO 2010/012364 A1 and corresponding U.S. Pat. No. 8,397,898 B2 disclose a system for sorting of goods in order to load the goods in an ordered sequence into a transport vehicle.

German Patent Application DE 10 2007 059 303 A1 discloses a system with a main conveyor belt which has at least two tracks revolving in the same direction. An outer track is used as an overtake track on which workpieces or work holding-fixtures which are not to be supplied to processing continue to be transported. Changing from one transport track to another transport track takes place by sliding vanes and assigned punches. Moreover, cross conveyors with conveyor belts which run in the opposite direction are assigned to each processing station, workpieces to be machined or work holding-fixtures being extracted via corresponding shunts from the main conveyor belt to the cross conveyors for processing in the respective processing apparatus. The known system requires a relatively large amount of space and also requires in addition to the main conveyor belt for each processing station two cross conveyor belts. This does not allow optimum progression of operations. German Patent Application DE 30 28 283 A1 and corresponding U.S. Pat. No. 4,544,318 disclose a similar production system.

In the processing/machining of lenses, it has been conventional to date to form a processing line from several processing apparatus which the lenses to be processed/machined pass through in succession. The processing line is then set in particular to certain processing or a lens shape. For different processing operations, for example, lenses which are to be processed/machined differently, either refitting must take place or a separate processing line is used. In the processing of different lenses this can result in that the rate of utilization of different processing lines is very uneven or that frequent refitting is necessary. The successive or linear passage through a given sequence of processing apparatus has the disadvantage that when one processing apparatus fails the processing must be stopped altogether. Furthermore the optimum rate of utilization of different processing apparatus, especially when they have different processing capacities, is not possible in conventional processing lines. Conventionally, all processing apparatus and conveyor apparatus are controlled by a central control. In particular, it is usually centrally established which processing apparatus machines which lens in which form. In existing processing lines expansion has therefore been very expensive to date. Conventionally, then complete rebuilding and reprogramming of the central control must be done.

SUMMARY OF THE INVENTION

The object of this invention is to devise a system for processing/machining of optical lenses and a method for processing/machining of optical lenses, optimized processing/machining and handling being enabled with high flexibility and/or a low space requirement especially also with consideration of different processing/machining speeds or capacities of different processing apparatus, especially expansion of the system being very easily possible.

This object is achieved by a system and method as described herein.

According to one aspect of this invention, each processing apparatus is assigned its own conveyor apparatus. Between the different processing apparatus with the assigned conveyor apparatus there are transfer apparatus. The transfer apparatus and the conveyor apparatus of the processing apparatus form a first transport track which runs especially at least essentially in a straight line. The transfer apparatus are made for accommodation and temporary interim storage and for continuous conveyance of at least one lens or lens carrier as required alternately to a following processing apparatus or conveyor apparatus or to a second transport track. Thus a compact structure and flexible processing are enabled.

According to another aspect of this invention, the conveyor apparatus assigned to one processing apparatus is integrated into the respective processing apparatus and/or (permanently) added to it. Especially preferably, the respective conveyor apparatus ends at least essentially flush or in the extension of one side of the processing apparatus. The length of the conveyor apparatus corresponds preferably at least essentially to the width of the respective processing apparatus. This is conducive to a compact structure of especially one system with several processing apparatus.

The transfer apparatus between the processing apparatus make it possible for a processing apparatus or the conveyor apparatus assigned to the processing apparatus to be able to be cleared again after completed processing of a lens or lens carrier. A processed/machined lens or a lens carrier with at least one processed/machined lens can continue to be conveyed specifically to the downstream transfer apparatus. The latter accepts the processed/machined lens or the lens carrier so that at this point the processing apparatus and its conveyor apparatus are free to accept the next lens or the next lens carrier from a transfer system, especially an upstream transfer apparatus. In this way idle times can be minimized and thus optimized use or optimized throughput can be achieved.

In particular, the transfer apparatus and the conveyor apparatus of the processing apparatus can be independently controlled and driven for independent conveyance of the lenses or lens carriers. Depending on the required processing, the conveyor apparatus can stop the respective lens or respective lens carrier for example, move it forward or if necessary even move it backward. This enables very high flexibility in the processing. Likewise, according to this invention, preferably a straight and/or continuous (first) transport track for the lenses or lens carriers is formed from the conveyor apparatus of the processing apparatus and from the transfer apparatus. This allows a compact structure.

The transfer apparatus are made preferably for alternate continued conveyance to a following conveyor apparatus and processing apparatus or to the second transport track, therefore respectively form preferably a shunt. Therefore, the transfer apparatus preferably allow changing from the first transport track to the second transport track. In particular, the transfer apparatus however also allows reversed changing from the second transport track to the first transport track. This allows a simple structure and a very flexible progression since lenses and lens carriers can change between the transport tracks as required. The second transport track can be used especially as a bypass track in order to be able to bypass individual processing apparatus.

The second transport track runs preferably parallel to the first transfer apparatus and/or at least essentially in a straight line.

The second transport track can be controlled preferably independently of the first transport track.

The second transport track is composed preferably of several conveyor apparatus which can be controlled and driven especially independently of one another and which form the second transport track in succession with transfer apparatus or change-over apparatus optionally located in between. This allows optimum conveyance, especially lenses or lens carriers being able to be conveyed or transported on a conveyor apparatus of the second transport track independently of the conveyance of other lenses or lens carriers on another conveyor apparatus of the second transport track.

Preferably, the transfer apparatus each have a receiving area for temporary interim storage of at least one lens or at least one lens carrier. Thus, a lens or a lens carrier can be accommodated and stored on an interim basis after prior processing in a processing apparatus. Alternatively, the lens or lens carrier can continue to be conveyed at a given time to another processing apparatus or to another transport track or conveyor apparatus of the transfer system. Alternatively or in addition, this accommodation or interim storage can also be used to accommodate another lens or another lens carrier by corresponding cross conveyance in addition from the transfer apparatus and to continue to convey it to a downstream processing apparatus or its conveyor apparatus (first). Then, the lens or lens carrier can continue to be conveyed out of the receiving area alternately to the downstream processing apparatus or to another conveyor apparatus or transport track. Accordingly, as required, very flexible processing is enabled.

Especially preferably, the transfer apparatus and their receiving area form corresponding receiving buffers for lenses or lens carriers. This makes it possible for other transfer apparatus or a second transport track or other transport tracks of the transfer system for example, to be able to essentially continuously convey. This enables a major simplification of control.

The second transport track and corresponding connections or cross conveyor apparatus between the first and second transport track, especially preferably between each processing apparatus, enable overtaking of lenses or lens carriers as necessary, for example, for processing of lenses with special priority, and/or bypass or selection of certain processing operations or processing apparatus. For example, a lens of polycarbonate can be conveyed to a processing apparatus which is set up or is especially well suited to this purpose, while a lens consisting of another material, for example, CR 39, can be conveyed to another processing apparatus which is set up or is especially well suited to this purpose.

According to one preferred aspect of this invention, the conveyor direction of the second transport track and/or of the transfer apparatus and/or of the conveyor apparatus of the processing apparatus can be reversed. This allows a compact structure and high flexibility in the processing.

According to another aspect of this invention, the transfer system preferably has in addition a third transport track for parallel conveyance, especially return, of lenses or lens carriers. In particular, the second and third transport tracks have conveyor directions which are opposite one another. The third transport track preferably runs at least essentially in a straight line and/or parallel to the other transport tracks. This allows a compact structure and optimized conveyance, and thus, optimized processing and rate of utilization of the processing equipment.

The third transport track is built preferably similarly or accordingly like the second transport track. Preferably, the third transport track is built out of several conveyor apparatus which are located in succession or in series with transfer or change-over apparatus located in between if necessary. The conveyor apparatus can preferably again be controlled independently of one another for independent conveyance of lenses or lens carriers.

Preferably, the changing apparatus are designed for changing between the second and third transport track or the transport tracks. The changeover apparatus can be formed by the transfer apparatus or separately or independently of them.

The change-over apparatus preferably have conveyor apparatus for cross conveyance of at least one lens or one lens carrier for changing between the second and third transport track or transport tracks.

Alternatively or in addition to the third transport track, the transfer system according to another aspect of this invention, has preferably a return conveyor connection for return or circulation of lenses or lens carriers. The return conveyor connection especially joins the first and second transport tracks, especially preferably in the area of the start and end and/or for formation of a circuit or the possibility of circular conveyance or circulation.

By means of the second transport track in conjunction with the third transport track and/or return conveyor connection, it is especially possible to start individual, several or all processing apparatus repeatedly and/or in any sequence, in particular therefore, to vary or optionally choose the sequence of processing operations, to vary or optimize the rate of utilization of the processing apparatus and/or to optimize the processing sequences.

The possibility of return by reversing the conveyor direction and/or via the third transport track or via the return conveyor connection simplifies in particular the expansion of the system in accordance with the invention. Other processing apparatus can be connected specifically easily to the end of the system or transport tracks via corresponding extensions of the transport tracks. Thus, for example, the capacity for certain processing operations can be increased as required by corresponding additional processing apparatus. These additional processing apparatus can then be supplied via the transport tracks if necessary with lenses or lens carriers or can be started. Then, preferably in turn, the transfer apparatus in accordance with the invention are located between the additional processing apparatus. After completed processing, in an additional processing apparatus if necessary, return can take place, for example, for further processing or for output, especially for example, to a delivery station of the original system. Consequently, no rebuilding or only minor rebuilding of the original system is necessary in an expansion. Accordingly, a very simple, prompt and economical expansion of the system in accordance with the invention is enabled.

According to one especially preferred aspect of this invention, the lenses or lens carriers are circulated or conveyed in a circuit, especially to store them on an interim basis and or to avoid congestion upstream of the processing apparatus. This takes place preferably in the second transport track in one direction and in the third transport track in the opposite direction, corresponding cross conveyances or cross connections between these two transport tracks being used to enable the desired circulation or circuit conveyance. Thus, these transport tracks can be used to store or store on an interim basis the lenses or lens carriers. Alternatively or in addition, in this way, unwanted congestion can be avoided. In particular, the lenses or lens carriers are extracted from the circuit or from circulation when a desired processing apparatus is available. The extraction takes place especially via corresponding cross conveyance and/or by a change to the first transport track or by a change to a transfer apparatus which is located upstream or assigned to the desired processing apparatus.

The transfer apparatus have preferably one conveyor apparatus at a time for longitudinal conveyance of at least one lens or one lens carrier parallel to one of the transport tracks and in addition a conveyor apparatus for cross conveyance of at least one lens or one lens carrier for changing the transport track. These conveyor apparatus can preferably be controlled independently of one another. This allows optimum conveyance, in particular the preferred temporary accommodation or interim storage of at least one lens or lens carrier especially on the conveyor apparatus for longitudinal conveyance taking place especially preferably in a receiving area upstream or downstream of the assigned conveyor apparatus for cross conveyance, the conveyor apparatus being made then relatively long for longitudinal conveyance.

The conveyor apparatus for cross conveyance of the transfer apparatus or change-over apparatus or parts or sections thereof can preferably be alternately raised and lowered by means of assigned lifting apparatus. Thus, if necessary, the cross conveyance can be used very easily when this is in fact needed. This applies especially when the conveyor apparatus are made as belt conveyors.

Preferably, the individual or all conveyor apparatus are made as belt conveyors. This allows a simple and economical structure and reliable conveyance of the lenses or lens carriers.

Especially preferably, the lenses are transported between the processing apparatus and from the transfer systems only by means of lens carriers or in lens carriers.

Lens carriers are especially preferably transport boxes.

The lens carriers preferably accommodate at least one lens at a time, especially two lenses or a pair of lenses, especially two spectacle glasses which belong together for spectacles.

According to another aspect of this invention, the system or the transfer system preferably has a preferably common or central control apparatus for control of the transfer apparatus, the conveyor apparatus of the processing apparatus being able to be controlled or driven by the respective processing apparatus or its machine control and especially independently of one another and/or independently of the transfer system or the transfer apparatus. This allows optimized, especially partially decentralized control. This can in particular result in the individual processing operations in the individual processing apparatus having priority and the transfer apparatus and other conveyor apparatus of the transfer system conveying the lenses or lens carriers to the processing apparatus or away from them only as necessary. Preferably, individual or several processing apparatus can automatically request or choose lenses or lens carriers for processing or have them conveyed, especially preferably independently of other processing apparatus and/or a central system control and/or a control apparatus, and for the processing necessary production and processing data, especially processing plans and processing statuses, lens data or the like can be retrieved if necessary from an especially central server, database system or the like or can be considered. This enables optimization of the processing sequence and is conducive to flexible processing. This further facilitates a simple and modular structure and an expansion of the system.

The transfer system or its components, such as the transfer apparatus, the optional change-over apparatus and/or the other conveyor apparatus (not the conveyor apparatus of the processing apparatus) are connected or can be connected preferably via a bus system to a control apparatus of the transfer system, for example, a memory-programmable control, and can be controlled via it. This enables a very simple structure and especially a very simple expansion of the system, especially the addition of other processing apparatus and a corresponding connection of other components to the transfer system.

Especially preferably, a cable with supply lines and control lines is used to which the conveyor apparatus or other components of the transfer system or the transfer apparatus and/or the processing apparatus can be connected. This facilitates a simple and modular structure or a simple connection and/or expansion of the system.

A method in accordance with the invention for processing is characterized especially in that the lenses or lens carriers with the lenses are alternately supplied to different processing apparatus for independent processing of the lenses, the lenses or lens carriers being conveyed independently by conveyor apparatus in the processing apparatus, the lenses or lens carriers being temporary accommodated by transfer apparatus between the processing apparatus and alternately continuing to be conveyed to the next processing apparatus or a parallel transport track. In doing so the transfer apparatus are controlled by a preferably central or common control apparatus, the conveyor apparatus of the processing apparatus conversely being controlled preferably by the respective processing apparatus or its machine control. This simplifies the control and allows especially optimized processing for the individual processing apparatus. Furthermore, in this way, expansion of the system and connection of other processing apparatus are greatly simplified.

In general, it is noted that the required processing steps and their sequence, in order to produce a processed/machined or finished lens from a lens or lens blank, are established in a so-called processing plan, but that for several processing apparatus for the same processing, for example, for polishing, the respective apparatus and thus the apparatus which are to be specifically used can be chosen. Independent processing by the processing apparatus should preferably be understood such that the processing in the respective apparatus proceeds independently of other processing operations and independently of the transfer system, however the sequence of the processing steps being dictated or maintained. The actual processing state is reflected in the processing status which in particular indicates which processing has already been completed or is to take place next, this taking place especially preferably with reference to the corresponding processing plan for the respective lens.

Alternatively or additionally, independent processing by the processing apparatus should preferably be understood such that the processing apparatus choose or request or deliver the lenses to be processed/machined or the lens carriers with lenses to be processed/machined automatically or independently of a central control, especially preferably with consideration of the required processing. This selection can alternatively take place in one logic plane or in the physical plane. In selection in the logic plane, the respective processing apparatus can select, for example, a job or a data set with information about a lens to be processed/machined from a data storage, database server, a system control or the like and then (have) this lens or the corresponding lens carrier with this lens conveyed. For choice in the physical plane a processing apparatus can detect or identify for example, lenses to be processed/machined or lens carriers with lenses to be processed/machined especially by means of a sensor or the like and with consideration of the respective job or data set with information on the required processing can choose a suitable lens or a corresponding lens carrier and have it conveyed to processing. This results in at least largely autonomous processing of lenses by the individual processing apparatus so that especially when systems are expanded an otherwise necessary very expensive reprogramming or new programming of central controls can be entirely omitted or at least minimized.

Therefore, one aspect of this invention lies especially in that the processing apparatus work at least as much as possible largely automatically or independently, so that especially preferably the processing apparatus retrieve or request lenses or lens carriers individually from the transfer system in order to carry out required processing and afterwards return the processed/machined lens(es) to the transfer system again, therefore inject them again into the conveyor or conveyor circuit. This independence of the processing apparatus greatly simplifies the incorporation of additional or new processing apparatus into the system.

In a processing apparatus which works independently in the aforementioned sense, it is important who gives the command that a new lens or a new lens carrier must be requested or loaded.

According to one preferred embodiment, the transfer system preferably has a sensor, for example, a bar code reading station or the like for lenses or lens carriers and communicates to an assigned processing apparatus, after corresponding detection and optionally evaluation, an identification or directly the processing status of a detected lens or of a detected lens carrier. The processing status can be optionally interrogated or gauged or ascertained using a central data storage, a central database, a central system control or the like. The processing apparatus can then automatically request or (have) the detected lens or the detected lens carrier delivered, to the extent the processing apparatus can carry out the processing required (next). In this type of request of lenses to be processed/machined already existing processing apparatus need not be updated or receive any special message when new or additional processing apparatus are being incorporated into the system and/or additional processing cycles are being scheduled. Rather, here, the production flow or the conveyance of lenses/lens carriers is controlled especially by a central control apparatus, especially by a so-called belt supervisory computer, of the transfer system—therefore of the belt or conveyor system—and/or by a system control of the system, in particular in this way the conveyance of the lenses or lens carriers along the processing apparatus is controlled or influenced.

According to one version, the processing apparatus has its own sensor, especially a bar code reading station or the like for detection and optionally identification of lenses or lens carriers. In this case, the processing apparatus can retrieve or request a detected lens or a detected lens carrier especially by direct triggering of a corresponding conveyor apparatus, transfer apparatus, change-over apparatus or the like if the respective processing apparatus can carry out the required processing. After completed processing, the processing apparatus changes the processing status of the lens or lens carrier, especially in a central database, system control or the like and delivers the machine lens or lens carrier back to the transfer system. In this version the processing apparatus can be independent and self-contained such that they control the production flow or the conveyance of the lenses or lens carriers. In this case, the respective conveyor apparatus must recognize the other conveyor apparatus on the transfer system or the system and likewise the processing plan—therefore, the processing sequence—must be known to it. When new processing apparatus are added and/or when the processing plan changes, this must be communicated to each processing apparatus or must be filed or made accessible in a corresponding central database, system control or the like.

Individual ones of the aforementioned and following aspects and features of this invention can be optionally combined with one another, but can also be implemented independently of one another.

Other aspects, features, advantages and properties of this invention will become apparent from the following description of preferred exemplary embodiments with reference to the accompanying drawings.

BRIEF DESCRIPTION OF THE DRAWINGS

FIG. 1 is a schematic side view of a system in accordance with the invention with several processing apparatus and transfer apparatus which are located in between;

DETAILED DESCRIPTION OF THE INVENTION

In the figures, the same reference numbers are used for the same or same type of components and apparatus, the same or corresponding advantages and properties arising even if a repeated description is omitted.

Figure 1:
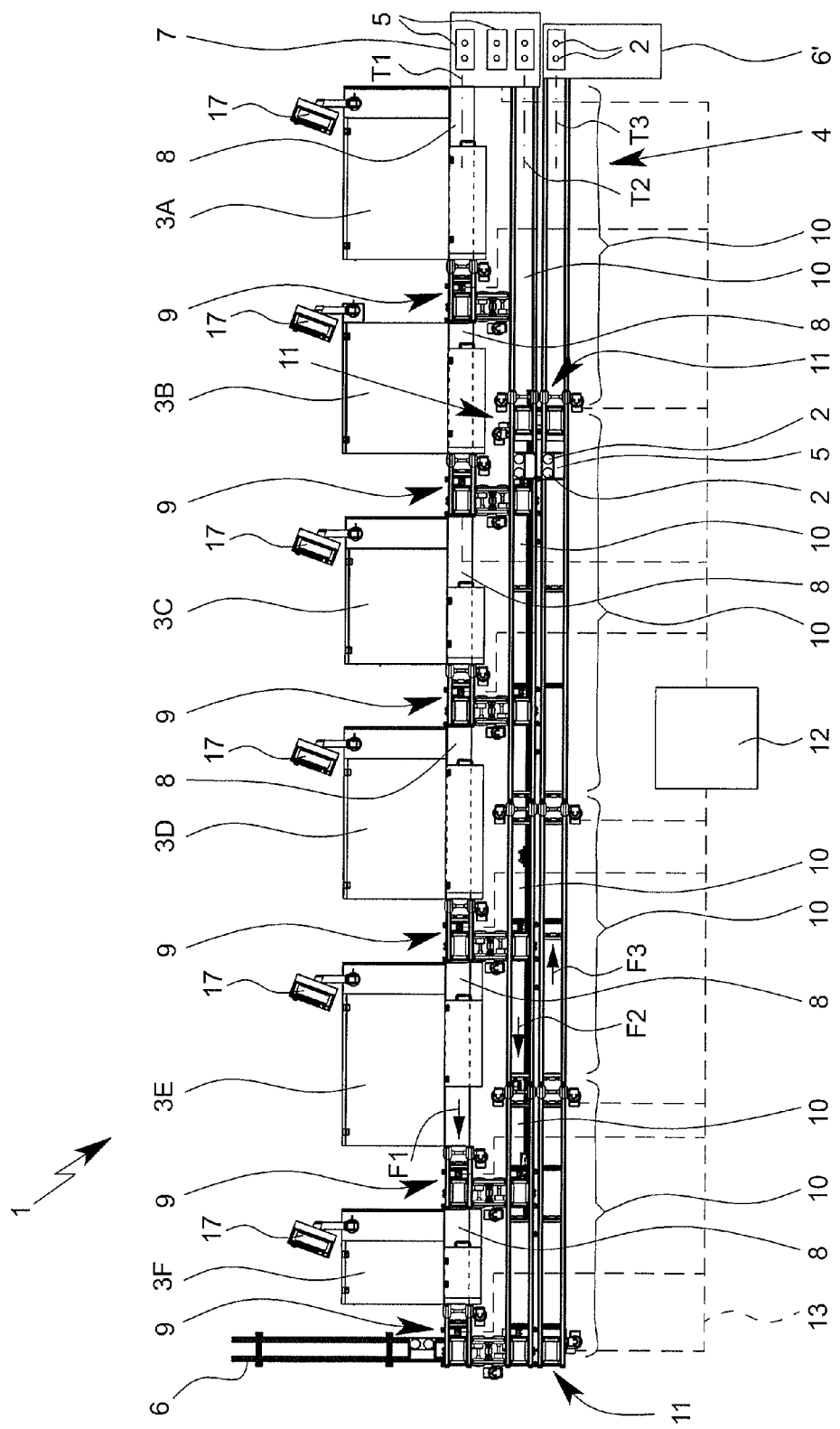

FIG. 1 is a schematic representation of a device or system 1 in accordance with the invention for processing/machining of optical lenses 2, therefore a lens processing system. Primarily, the processing/machining of lenses for eyeglasses or of spectacle glasses is explained below as an especially preferred exemplary embodiment. Preferably, however, these details also apply accordingly to the processing/machining of other lenses 2 or more generally optical workpieces.

The system 1 has several separate processing apparatus 3 for independent processing/machining of lenses 2. For example, the system 1 can have especially at least one processing apparatus 3A for blocking (temporary connection to a holder) of lenses 2, a processing apparatus 3B for intermediate storage of lenses 2 (preferably for cooling after blocking), a processing apparatus 3C for forming, especially cutting or milling of lenses 2, a processing apparatus 3D for polishing of lenses 2, a processing apparatus 3E for testing or measuring of lenses 2, a processing apparatus 3F for marking of lenses 2 and/or a processing apparatus 3G for coating of lenses 2 (indicated in FIG. 5).

If necessary there can also be several identical processing apparatus 3, for example, two or more processing apparatus 3 for the same processing/machining or they can be integrated into the system 1. For example, there can be several processing apparatus 3C for forming, several processing apparatus 3D for polishing, etc. This depends especially on the throughput of the different processing apparatus 3 and/or the desired processing operations. One special advantage of the system 1 in accordance with the invention consists specifically in that additional processing apparatus 3 can also be very easily incorporated or integrated into the system 1 later as required. Expansions can also take place very easily.

The system 1 has preferably a transfer system 4 for transport of lenses 2 or lens carriers 5 with the lenses 2 to and from the processing apparatus 3. The transfer system 4 feeds the lenses 2 or lens carriers 5 especially to the processing apparatus 3 and/or transports or conveys the lenses 2 or lens carriers 5 after completed processing/machining in one processing apparatus 3 to another processing apparatus 3 or to a delivery station 6. The delivery station 6 can be made for example, as a transfer apparatus, roll table or as some other storage apparatus.

In addition to the delivery station 6, the system 1 also preferably has a receiving station 7 which is used to accommodate lenses 2 to be processed/machined or lens carriers 5 which bear the lenses 2 to be processed/machined.

The delivery station 6 in the illustrated example is located preferably separately from the receiving station 7, for example, on an opposite side. But, the receiving station 7 and the delivery station 6 can also necessarily be located next to one another or adjacent, as indicated in FIG. 1 by the delivery station 6' which is shown in addition as an alternative next to the receiving station 7 and/or can be formed by a common apparatus or the like and/or can be located at any locations on the transfer system 4.

Each processing apparatus 3 is assigned preferably its own conveyor apparatus 8 for especially linear conveyance of at least one lens 2 or one lens carrier 5. In particular, the assigned conveyor apparatus 8 is integrated or installed in the respective processing apparatus 3 or is added to it. The conveyor apparatus 8 is made preferably as a conveyor belt.

The conveyor apparatus 8 of the processing apparatus 3 are each controlled by the respective processing apparatus 3 or its machine control (not shown in FIG. 1).

Especially preferably, the processing apparatus 3 are made as compact as possible or at least essentially cuboidal or with a rectangular base area, the conveyor apparatus 8 being located preferably in the back, therefore on one side which is opposite a control or operating panel 17 of the processing apparatus 3, or on one narrow side of the respective processing apparatus 3. But fundamentally, another arrangement, in particular on a longitudinal side of the respective processing apparatus 3, is possible.

Especially preferably, the conveyor apparatus 8 do not project laterally or do so only slightly above the respective processing apparatus 3 and/or by a uniform amount. In particular the length of the conveyor apparatus 8 corresponds at least essentially to the width of the respective processing apparatus 3.

Preferably, the passage width between adjacent processing apparatus 3 is fixed by a transfer apparatus 9 which is located in between; this will be detailed below. The passage width is, for example, roughly 60 cm. A passage between adjacent processing apparatus 3 is especially necessary or desirable for maintenance or repair purposes and/or also for refilling of consumables or the like.

The processing apparatus 3 are preferably set up or located next to one another so that the conveyor apparatus 8 run essentially in one line or lie behind one another and/or form a first transport track T1 which is preferably at least essentially straight (indicated by the dot-dash line in FIG. 1).

It is noted that the first transport track T1 and/or a second transport track T2 also correspond to a traverse, therefore can be built up out of different straight lengths or sections and can for example, run diagonally or in a U shape. Along these sections preferably several processing apparatus 3 at a time are arranged in a row such that these processing apparatus 3 with their conveyor apparatus 8 are located along this length or this section. This leads to great flexibility in expansion(s) of the system 1 in accordance with the invention, since in particular more or less any extensions, especially when adding to or expanding the system 1, are enabled especially by incorporating additional processing apparatus 3 and/or for corresponding enlargement of the transfer system 4.

The transfer system 4 has preferably transfer apparatus 9 which are each located between two adjacent processing apparatus 3 (of one row). Preferably the transfer apparatus 9 are located between some or all (directly) adjacent processing apparatus 3.

The transfer apparatus 9 are preferably each made for accommodating and temporary intermediate storage of at least one lens 2 or one lens carrier 5 and moreover for continued conveyance of this lens 2 or this lens carrier 5 as necessary alternately to the conveyor apparatus 8 of a following processing apparatus 3 or to a second transport track T2 of the system 1 or of the transfer system 4.

The second transport track T2 runs preferably like the first transport track T1 at least essentially in a straight line or polygonally and/or parallel to the first transport track T1.

The receiving station 7 is made preferably for accommodating lenses 2 to be processed/machined or lens carriers 5 with the lenses 2 to be processed/machined. The receiving station 7 can be made especially such that it outputs the lenses 2 to be processed/machined or the lens carriers 5 alternately to the transport track T1 or T2.

The transfer system 4 has preferably several conveyor apparatus 10 which are arranged especially in a row or in succession in order to form the second transport track T2. The lenses 2 or lens carriers 5 can therefore be transported or conveyed along this second transport track T2 by means of one or more conveyor apparatus 10.

The conveyor apparatus 10 of the second transport track T2 can preferably be controlled independently of one another in order to be able to convey lenses 2 or lens carriers 5 independently of one another or in sections also along the second transport track T2. For example, a lens 2 or lens carrier 5 can be stopped on a conveyor apparatus 10 while another lens 2 or another lens carrier 5 continues to be conveyed on another conveyor apparatus 10 of the second transport track T2.

Due to the preferably segmented or sectional structure of the second transport track T2 and due to the use of independently controllable conveyor apparatus 10 for the second transport track T2, it is also possible for individual conveyor apparatus 10 to convey opposite the conveyor direction F1 of the first transport track T1, therefore backwards, while other conveyor apparatus 10 of the second transport track T2, for example, are stopped or continue to convey forward.

Figure 3:
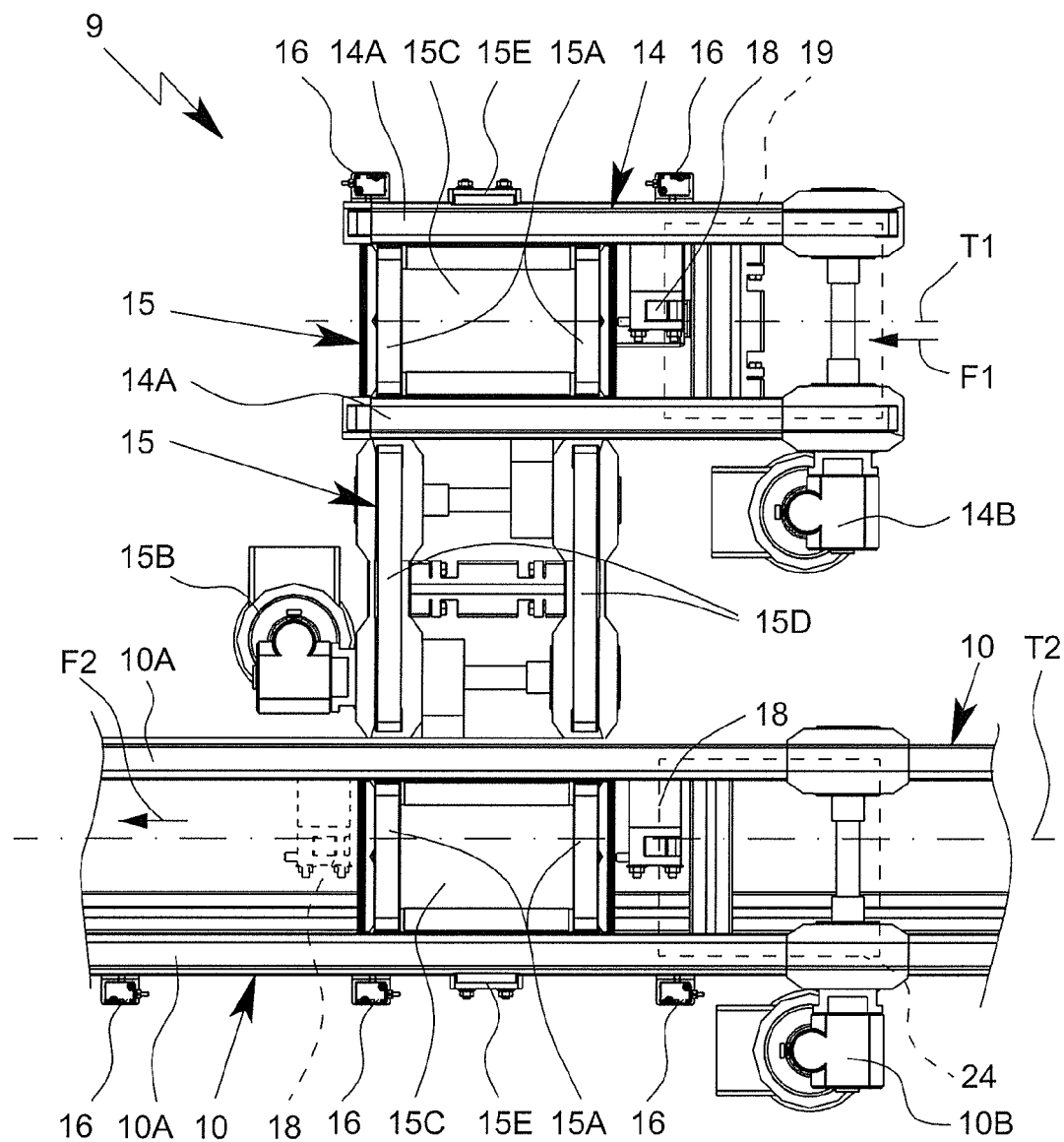
FIG. 3 is a plan view of a transfer apparatus of the system in accordance with the invention in an extract enlargement from FIG. 1.

Alternatively or in addition to the different control of conveyor apparatus 10 of the second transport track T2 and/or conveyance backward, individual lenses 2 or lens carriers 5 can also be stopped by corresponding stopping apparatus or the like (see, for example, stopping apparatus 18 in the transport track T2 in FIG. 3) so that, in this case, the conveyor apparatus 10 can be operated further or continuously. This applies preferably to some or all transport tracks or conveyor apparatus.

Between the conveyor apparatus 10 of the second transport track T2, there can be transfer apparatus 9 if necessary. But, the transfer apparatus 9 can alternatively also convey directly onto an assigned conveyor apparatus 10 of the second transport track T2. In this case, the conveyor apparatus 10 can be located in succession without the interposition of transfer apparatus 9, as indicated in FIGS. 1 and 3.

The conveyor direction of the first transport track T1 is indicated in FIG. 1 by an arrow F1. The second transport track T2 conveys preferably in the same direction as indicated by arrow F2. The second transport track T2 is used especially for the lenses 2 or lens carriers 5 to be able to be conveyed past individual processing apparatus 3. For example, this conveying past can be desirable or necessary for a better rate of utilization of processing apparatus 3, for conveyance to a certain processing apparatus 3 for special processing, due to a failure or based on the rate of utilization of a processing apparatus 3, or due to unnecessary processing by a processing apparatus 3. Alternatively or in addition, the conveying past can also be used for overtaking of other lenses 2 or lens carriers 5, for example, when priority processing of a certain lens 2 or several certain lenses 2 is to take place.

Preferably, the lenses 2 or lens carriers 5 can change between the first and second transport track T1, T2 by means of the transfer apparatus 9. In particular, this change-over is possible between each of the processing apparatus 3 and/or by means of each transfer apparatus 9 and/or in any direction, therefore from the first to the second transport track T1, T2 and vice versa.

The system 1 or the transfer system 4 has preferably a third transport track T3 which runs preferably at least essentially in a straight line and/or parallel to the other transport tracks T1 and T2.

The conveyor direction F3 of the third transport track T3 is preferably directed opposite the conveyor directions F1 and F2 of the other transport tracks T1 and T2 or runs preferably backwards. Therefore, the transport track T3 is used especially for return or opposite conveyance of lenses 2 or lens carriers 5, for example, for re-insertion (via corresponding change-over possibilities) into the first or second transport track T1, T2 for further processing or for return for example, to the delivery station 6'.

The third transport track T3 is preferably built correspondingly or similarly to the second transport track T2, especially preferably out of several conveyor apparatus 10 which are arranged in a line or in succession, as indicated in FIG. 1. The conveyor apparatus 10 of the third transport track T3 can preferably be driven or controlled again independently of one another so that independent conveyance of lenses 2 or lens carriers 5 along the third transport track T3 is possible, as was already described above fundamentally for the second transport track T2, so that the details in this respect apply especially accordingly or in a supplementary manner.

Alternatively or in addition to the different control of conveyor apparatus 10 of the third transport track T3 and/or to conveyance backward, individual lenses 2 or lens carriers 5 can also be stopped by corresponding stopping apparatus or the like (not shown) so that in this case the conveyor apparatus 10 can be operated further or continuously.

The system 1 or the transfer system 4 has preferably change-over apparatus 11 for changing between transport tracks T, especially between the second transport track T2 and the third transport track T3, therefore alternately from the second transport track T2 to the third transport track T3 and vice versa. The change-over apparatus 11 can be located in the two transport tracks T2 and T3 between the conveyor apparatus 10. In this case, the change-over apparatus 11 are also used for certain continued conveyance in the direction of the respective conveyor direction F2 or F3, therefore for longitudinal conveyance. Alternatively, the change-over apparatus 11 can also be integrated into assigned conveyor apparatus 10 or interact with them such that the change-over apparatus 11 are used only for cross conveyance, therefore solely for conveyance between the respective transport tracks T2 and T3. This type of integration is preferable and is shown in the illustrated example.

The transfer apparatus 9 in the illustrated example are integrated preferably accordingly into the second transport track T2 or into the assigned conveyor apparatus 10 of the second transport track T2. In other words, the transfer apparatus 9 in the illustrated example preferably do not effect longitudinal conveyance or continued conveyance in the second transport track T2 in the conveyor direction F2.

The change-over apparatus 11 and the transfer apparatus 9 can also be located combined or in extension or can form a unit as is indicated by way of example in FIG. 1 in the region of the delivery station 6.

Alternatively, all or individual transfer apparatus 9 or change-over apparatus 11 can also be made such that they additionally enable alternate cross conveyance as far as to the optional transport track T3 and/or a necessary change-over between all transport tracks T1 to T3 or between the transport tracks T1 and T3.

Preferably, the system 1 in the region of one end or of the delivery station 6, especially when the latter is spatially separate from the feed station 7, has an assigned transfer apparatus 9 and/or change-over apparatus 11, as indicated in FIG. 1.

Figure 5:
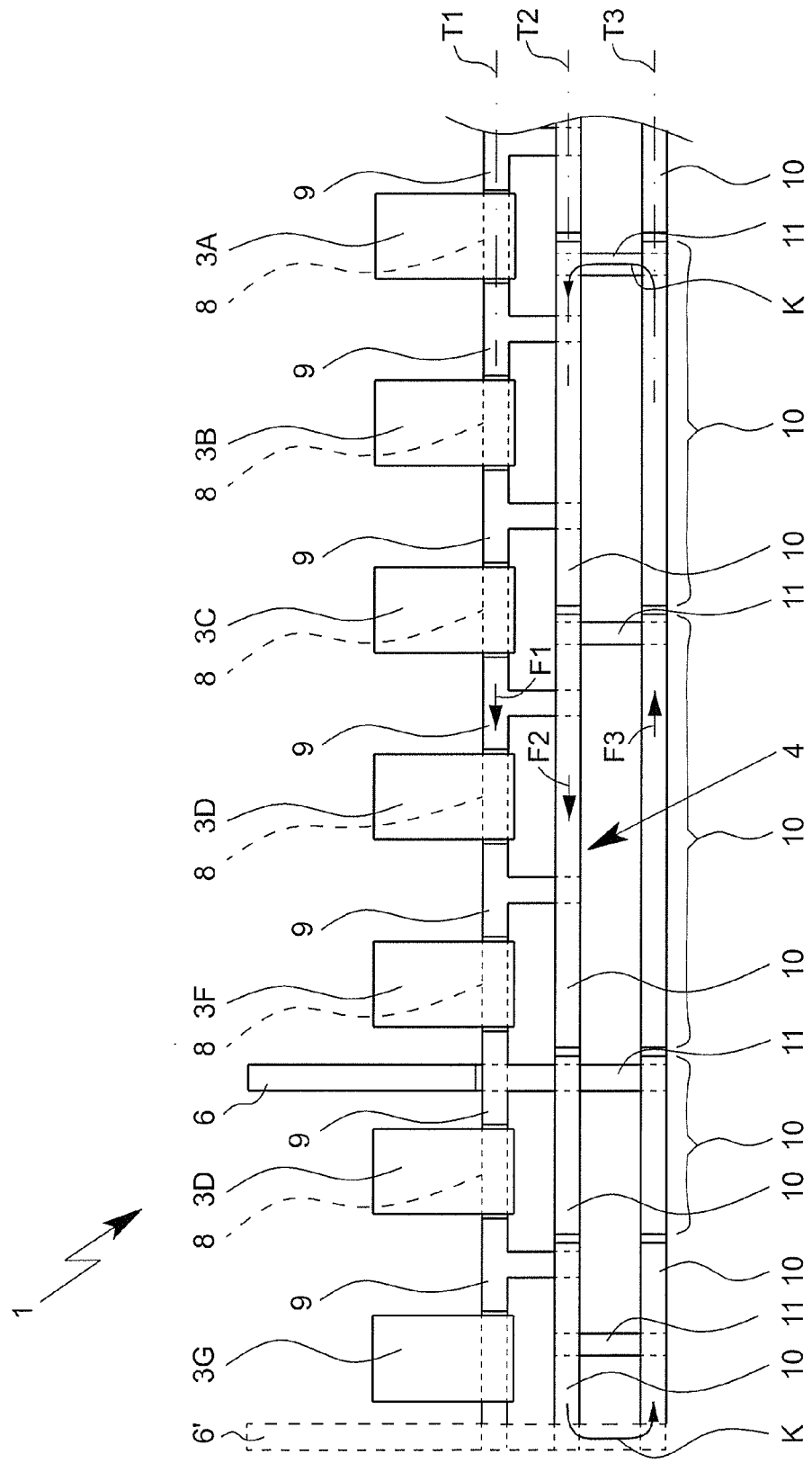
FIG. 5 is a schematic side view of the system in accordance with the invention according to another exemplary embodiment.
Figure 6:
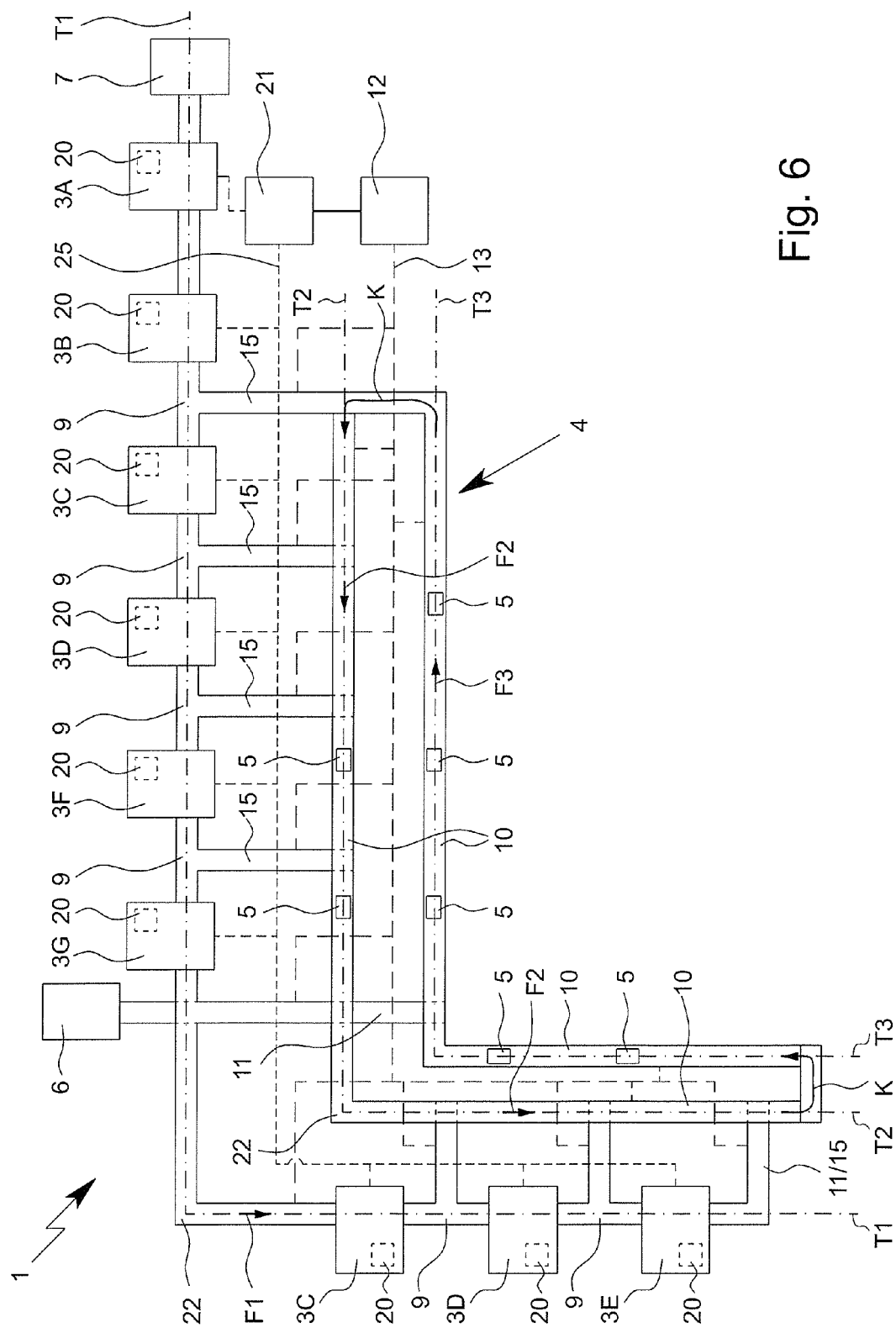
FIG. 6 is a schematic representation of the system in accordance with the invention according to a further exemplary embodiment.
Figure 7:
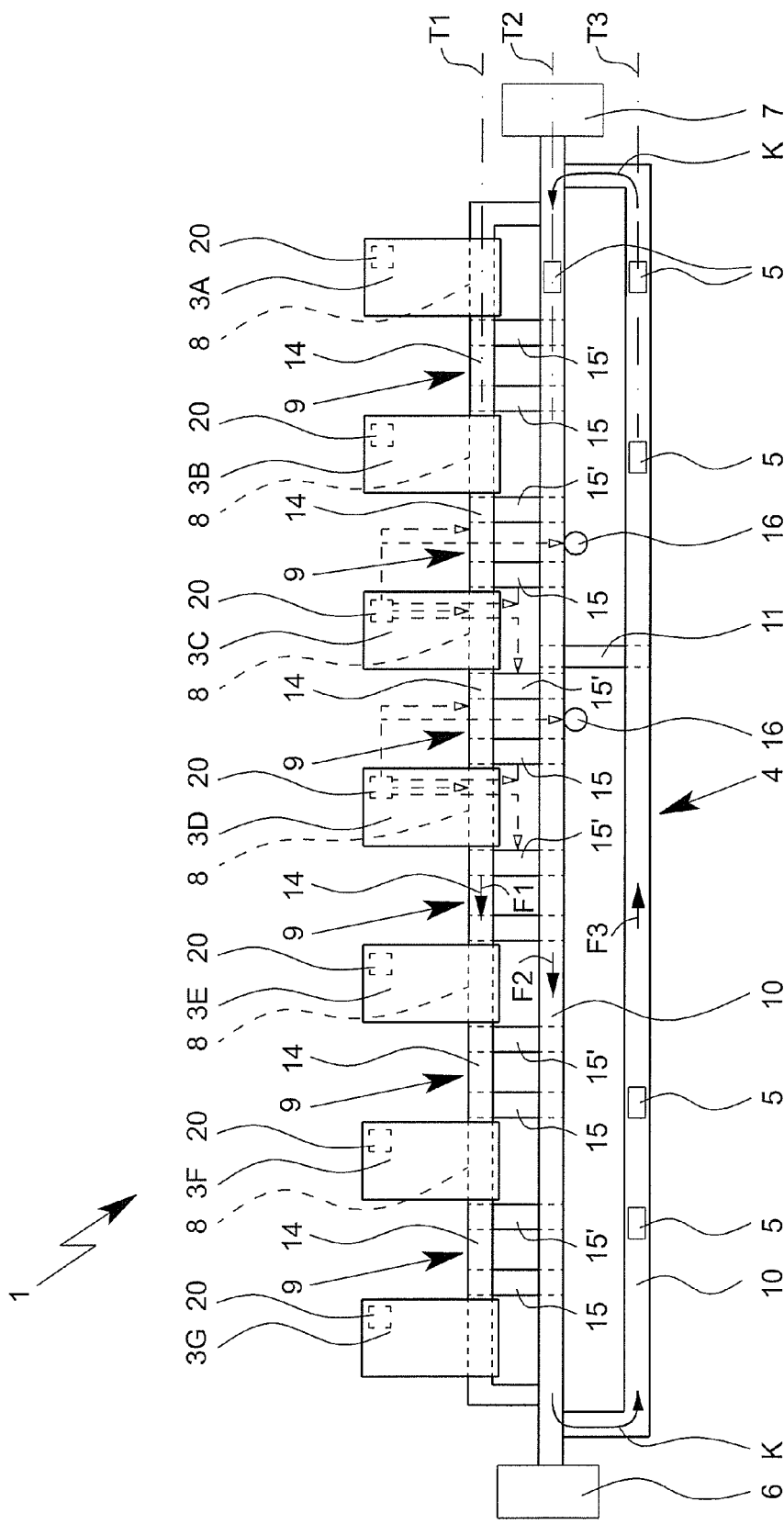
FIG. 7 is a schematic side view of the system in accordance with the invention according to still another exemplary embodiment.

Preferably, change-over apparatus 11 are located in the region of the start and end of the third transport track T3 and/or one or more in between, especially to enable a circuit or circulation or circular conveyance K of lenses 2 or lens carriers 5 as indicated in FIGS. 5-7.

The system 1 or the transfer system 4 preferably has a transfer control or control apparatus 12—especially a memory-programmable control—for control of the transfer apparatus 9 and/or conveyor apparatus 10 as well as, if present, change-over apparatus 11 and optionally, the receiving station 7 and/or delivery station 6, as indicated in FIG. 1. Connection takes place especially preferably via a bus system 13 which is indicated in FIG. 1 by the broken line. In particular, power supply and/or control takes place via the bus system 13. Especially preferably, the bus system 13 has a bus cable which contains all supply lines and/or control lines.

In an expansion of the system 1, other components, such as transfer apparatus 9, conveyor apparatus 10 or change-over apparatus 11 can be easily connected directly to the bus system 13 or bus cable. Accordingly, expansion of the system 1 or of the transfer system 4, optionally also rebuilding, is very easily possible.

Preferably, therefore, common or central control of the transfer system 4 takes place. The conveyor apparatus 8 assigned to the processing apparatus 3, however, preferably does not form part of the transfer system or of the transfer control. Instead, the conveyor apparatus 8 of the processing apparatus 3 are controlled preferably by the processing apparatus 3 themselves or directly or by their machine controls (compare machine controls 20 in FIGS. 6 and 7). The conveyor apparatus 8 are accordingly connected preferably to the assigned processing apparatus 3 or their machine control 20 for control of the respective conveyor apparatus 8.

Figure 2:
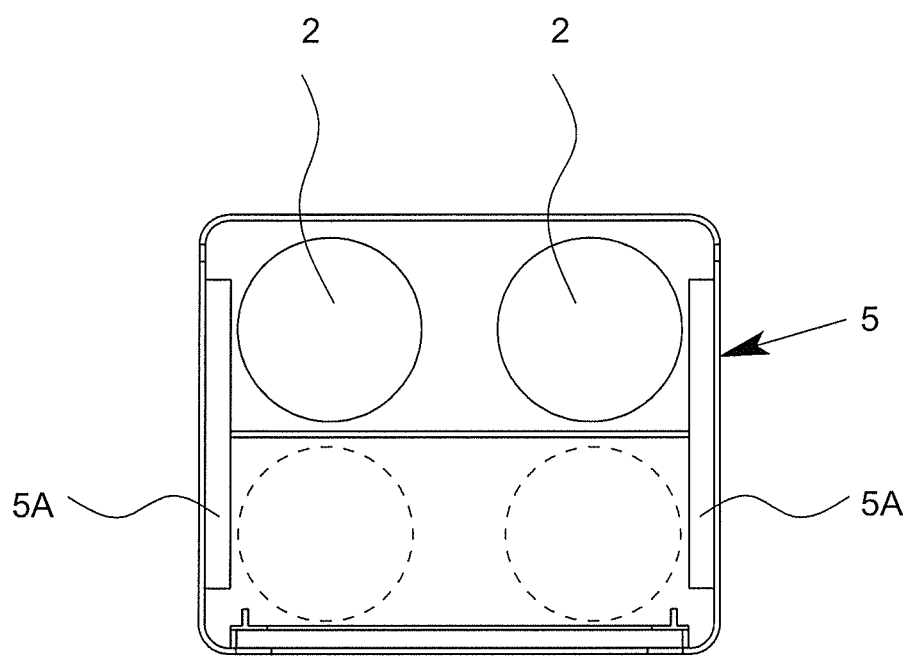
FIG. 2 shows a schematic of a lens carrier with lenses which are to be machined.

FIG. 2 shows in a schematic plan view one preferred embodiment of a lens carrier 5 for accommodating at least one, in the illustrated example, especially two or more lenses 2 to be processed/machined. In lens processing/machining or processing/machining of spectacle glass, conventionally, two lenses 2 to be processed/machined or a pair of lenses are received/accommodated by one lens carrier 5. This is also preferred here.

The lens carrier 5 has preferably coding 5A, for example, a bar code or the like with important processing/machining data, data for identification and/or other information for the two lenses 2, or for each lens 2 has separate coding 5A, as indicated in FIG. 2. Especially preferably, the coding 5A contains an identification or job number or the like for the respective lens(es) 2 so that by means of the identification or job number a processing plan and/or processing status or required processing steps, processing sequences, processing data and/or other information can be determined or can be retrieved therefrom, for example, via a corresponding server system, database system or the like, especially a system control 21, as indicated in FIG. 6.

Preferably, the distance of the lenses 2 in a lens carrier 5 is exactly as great as the distance of one lens 2 in one lens carrier 5 to the adjacent lens 2 in a directly adjacent lens carrier 5. This simplifies handling or positioning, especially in the processing apparatus 3. This distance is preferably 130 mm in the illustrated example. The length of the lens carrier 5 is preferably twice that, therefore here 260 mm.

The lens carrier 5 in the illustrated example is made preferably box-shaped and/or at least essentially square in a plan view.

In the illustrated example, the lens carrier 5 has preferably additional storage or receiving sites, for example, for tools, especially polishing tools, as indicated by broken lines in FIG. 2.

FIG. 3 shows in a schematic or enlargement of FIG. 1 one preferred structure of a transfer apparatus 9 in accordance with the invention. The transfer apparatus 9 has preferably a (first) conveyor apparatus 14 for longitudinal conveyance (conveyance in the direction F of the transport track T, especially of the first transport track T1) and a (second) conveyor apparatus 15 for cross conveyance (conveyance transversely or perpendicularly to the conveyor direction F or transport tracks T or to the transport track change).

The conveyor apparatus 14, 15 are preferably made as belt conveyors similar to the conveyor apparatus 8 and/or 10. In the illustrated example, the conveyor apparatus 10 preferably have belts 10A and assigned drives 10B. The conveyor apparatus 14 have preferably belts 14A and assigned drives 14B. The conveyor apparatus 15 preferably have belts 15A and assigned drives 15B.

By means of the belts 10A, 14A, 15A, which can be driven by the assigned drive 10B, 14B or 15B, lenses 2 or lens carriers 5 lying on them can be conveyed linearly in the respective conveyor direction F or transversely thereto in cross conveyance.

The transfer apparatus 9 is preferably made for accommodation and temporary storage of at least one lens 2 or one lens carrier 5, and for this purpose, has especially a storage or receiving area 19, as is shown in FIG. 3 by the broken line. It is formed in the illustrated example preferably by the conveyor apparatus 14 which has a length which is sufficient for this purpose. In particular the length of the conveyor apparatus 14 is at least the single length of a lens carrier 5, in the illustrated example, even at least twice the length of the lens carrier 5 in order to be able to accommodate or store it on an interim basis preferably next to or in the conveyor direction F1 upstream or downstream of the conveyor apparatus 15 for cross conveyance or its lifting table 15C. To do this the receiving area 19 is assigned preferably a suitable stopping apparatus 18 (for example, with a stop which can be folded or moved in the path of motion or an isolator) for necessary stopping of the lens carrier 5 or one lens carrier 5 in the receiving area 19. The stopping apparatus 18 can stop a lens carrier 5, here in the receiving area 19, especially also as the conveyor apparatus 14 continues to travel.

In this connection, it is noted that stopping of the lens carrier 5 preferably, in general, takes place by means of corresponding or similar stopping apparatus 18 (such as shown for example, in the second transport track T2 in FIG. 3) at the desired sites or positions of the transfer system 4 and/or of the conveyor apparatus 8 in order to be able to stop the lens carriers 5 individually or exactly, optionally also as the conveyor apparatus 8, 10, 14 and/or optionally 15 or belts continue to travel.

Preferably, the system 1 or the transfer system 4 or the respective conveyor apparatus 8, 10, 14, 15, transfer apparatus 9 and/or change-over apparatus 11—in particular, in addition to the stopping apparatus 18 or the aforementioned stopping apparatus which are not shown, has suitable sensors 16, such as photoelectric barriers, bar code readers or the like, especially to detect the presence of lenses 2 of lens carriers 5 or their position and/or to correctly position the lens carriers 5 and/or to detect or identify the lenses 2 or lens carriers 5, especially preferably to be able to read codings 5A.

In the illustrated example the length of the conveyor apparatus 14 or of the transfer apparatus 9 in the conveyor direction F1 corresponds at least essentially to the distance of adjacent processing apparatus 3 or adjacent conveyor apparatus 8 or the passage width between adjacent processing apparatus 3, as already mentioned, or at least the length of two lens carriers 5.

It is noted that the processing apparatus 3 are preferably generally set up at least with essentially the same spacing. Accordingly, preferably identical transfer apparatus 9 can be inserted or located in between.

The conveyor apparatus 15 for cross conveyance, as indicated in FIG. 3, in the transfer apparatus 9, according to the illustrated example, has preferably an intermediate conveyor with belts 15D between the two transport tracks T1, T2 and between the conveyor apparatus 14 and the adjacent conveyor apparatus 10.

The conveyor apparatus 15 preferably has a common drive 15B for driving the belts 15A and, if present, 15D.

The belts 15A are preferably arranged in pairs between the belts 14A of the conveyor apparatus 14 and the belts 10A of the conveyor apparatus 10 and are each carried preferably by a lifting element, especially a lifting table 15C.

The lifting element or the lifting table 15C and the lifting elements/lifting tables 15C, and thus, the assigned belts 15A, can preferably be raised and lowered as necessary preferably by means of an assigned lifting apparatus (not shown).

In operation, the conveyor apparatus 14 can accommodate a lens carrier 5 from an upstream processing apparatus 3 and can temporarily store it, especially in the receiving area 19 and/or over the lifting table 15C or over the belts 15A. If necessary, the transfer apparatus 9 or its conveyor apparatus 14 can continue to convey the lens carrier 5 to the downstream processing apparatus 3 or deliver it again. Alternatively, the transfer apparatus 9 or its conveyor apparatus 15 can change the lens carrier 5 to the transport track T2, therefore can convey it crosswise. In this case, the lifting table 15C is raised until the lens carrier 5 (not shown in FIG. 3) is raised off the belts 14A of the conveyor apparatus 14. Then, the lens carrier 5 is conveyed by means of the belts 15A—in the illustrated example via the optional intermediate conveyor or the belts 15D—to the second transport track T2 or onto the belts 15A there. Preferably, the lifting table 15C in the transport track T2 or in the conveyor apparatus 10 is also always raised at the same time or in the same way for cross conveyance. A preferred lateral stop 15E, which projects laterally upward over the conveyor apparatus 10 or its belts 10A, prevents the lens carrier 5 from being conveyed too far in the crosswise direction or the lens carrier 5 from being conveyed laterally beyond the conveyor apparatus 10.

Then, the conveyor apparatus 15 or its lifting tables 15C is or are lowered again, and thus, the lens carrier 5 is transferred to the conveyor apparatus 10 or deposited on its belts 10A so that at this point conveyance can take place along the second transport track T2 by means of the conveyor apparatus 10.

In the illustrated example, the conveyor apparatus 15 for cross conveyance is integrated into the conveyor apparatus 10 for longitudinal conveyance since there is no separate conveyor apparatus for longitudinal conveyance of the transfer apparatus 9 in the second transport track 10, in contrast to the conveyor apparatus 14 for longitudinal conveyance of the transfer apparatus 9 in the first transport track T1. But fundamentally this additional conveyor apparatus 14 of the transfer apparatus 9 can also be fundamentally provided in the second transport track T2.

The transfer apparatus 9 can be used not only for changing the lens carrier 5 from the first transport track T1 to the second transport track T2, but of course also for the reverse change, especially for injecting a lens 2 or a lens carrier 5 into the transport track T1 for processing/machining in a following processing apparatus 3. In this case the lens carrier 5 is positioned by the second transport track T2 or the assigned conveyor apparatus 10 via the conveyor apparatus 15 for cross conveyance or its lifting table 15C in the second transport track T2. Positioning takes place preferably by means of a stopping apparatus 18, for example, by means of the stopping apparatus 18 which is shown by the broken line, and which is located especially in the second transport track T2 or following the lifting table 15C.

Subsequently, the lifting of the transport tables 15C and then the cross conveyance to the transport track T1 can take place by corresponding driving of the belts 15A, 15D by means of the drive 15B until the lens carrier 5 is positioned on the conveyor apparatus 14, and the receiving area 19 can also be occupied by another lens carrier 5 since the receiving area 19 is located preferably next to or especially upstream or downstream of the conveyor apparatus 15. The positioning of the lens carrier 5 which has been conveyed crosswise in the transport track T1 can in turn by facilitated or fixed by an optional lateral stop 15E.

The transfer apparatus 9 is used preferably both for injection of lenses 2 or lens carriers 5 into the first transport track T1 and also for extraction of lenses 2 or lens carriers 5 from the transport track T2 into another transport track, here the second transport track T2.

The transfer apparatus 9 is especially made such that a lens 2 or a lens carrier 5 can be cross-conveyed or injected into the first transport track T1 while another lens 2 or another lens carrier 5 is located in the receiving area 19 or is stored there on an interim basis. Thus lenses 2 or lens carriers 5 can also be injected between other lenses 2 or lens carriers 5 in the first transport track T1.

Furthermore the transfer apparatus 9, as already indicated, allows alternate continuous conveyance of a lens 2 or a lens carrier 5 from the previous processing apparatus 3 (in the first transport track T1) or out of the receiving area 19 to the next processing apparatus 3 and also extraction or cross conveyance from the first transport track T1 to another transport track T, here the second transport track T2. In particular, the transfer apparatus 9 therefore forms a shunt with the especially upstream receiving area 19 for intermediate storage.

Since the transfer apparatus 9 is made preferably also for the already mentioned injection of lenses 2 or lens carriers 5 into the first transport track T1, the transfer apparatus 9 forms in particular a versatile shunt which proceeding from the first conveyor direction F1 enables branching for cross conveyance for extraction and also injection especially via the same cross conveyance with the opposite direction and for continued conveyance in the first conveyor direction F1. Thus a very versatile, compact structure is enabled.

It should be noted that the transfer system 4 or the second transport track T2 enables preferably stopping of lenses 2 or lens carriers 5 prior to cross conveyance of the transfer apparatus 9, especially for injection into the second transport track T2, for example, in one upstream stopping area 24 at a time, as indicated by the broken line in FIG. 3, in particular by means of an assigned stopping apparatus 18 or the like, so that undisrupted injection of lenses 2 or lens carriers 5 into the second transport track T2 can take place.

Preferably a sensor 16 for detecting or identifying lenses 2 or lens carriers 5 in the stopping area 24 is assigned to the stopping area 24.

Preferably sensors 16 are also assigned to the lifting tables 15C or are located in the region of the conveyor apparatus 15 of the first and/or second transport track T1 and T2 respectively in order to be able to identify or detect lenses 2 or lens carriers 5 there.

Preferably at least one sensor 16 which is assigned to one transfer apparatus 9 and/or to the receiving area 19 and/or the stopping area 24 is assigned to the downstream processing apparatus 3 so that arriving lenses 2 or lens carriers 5 can be detected and preferably identified via this sensor 16 or these sensors 16 in order to be able to recognize and if necessary request lenses 2 suitable for processing/machining in the assigned processing apparatus 3—in particular with recourse to or consideration of the processing/machining plan and processing/machining status of the respective lens 2.

Figure 4:
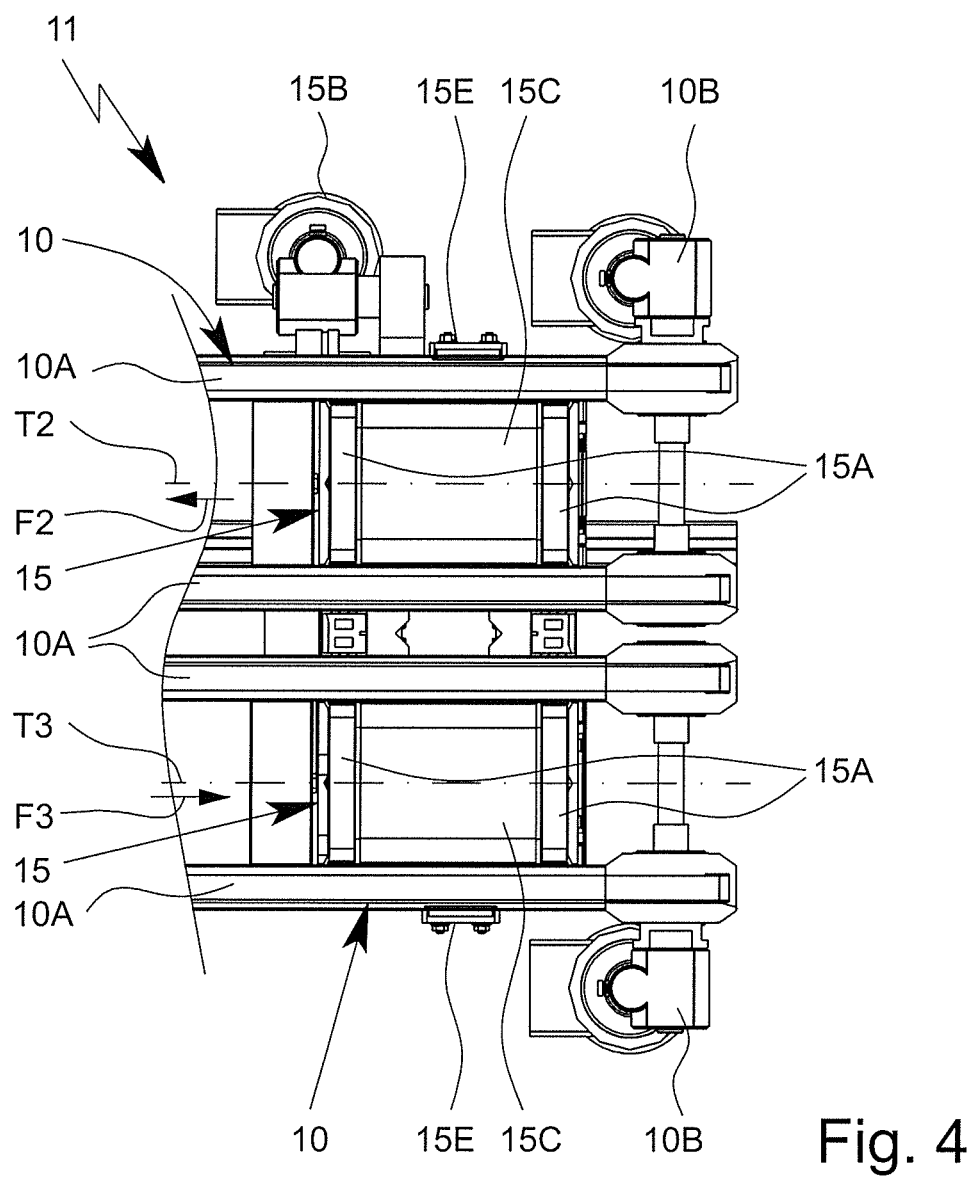
FIG. 4 is a plan view of a change-over apparatus of the system in accordance with the invention for changing between transport tracks in an extract enlargement from FIG. 1.

FIG. 4 shows in a schematic enlarged view of FIG. 1 a preferred structure of a change-over apparatus 11. The change-over apparatus 11 preferably has a conveyor apparatus 15 for cross conveyance similarly to the conveyor apparatus 15 of the transfer apparatus 9 so that reference is made to details in this respect. In contrast to the conveyor apparatus 15 of the transfer apparatus 9, the conveyor apparatus 15 of the change-over apparatus 11 preferably does not have or has a much smaller intermediate conveyor, in particular since the two transport tracks T2 and T3 lie very close or (much) closer next to one another than the transport tracks T1 and T2, the spacing is therefore preferably smaller. For the change-over apparatus 11 therefore the drive 15B of the conveyor apparatus 15 is preferably not located between the assigned transport tracks T2 and T3, but preferably laterally, in particular on the transport track T2 toward the transport track T1.

For reasons of simplification, FIG. 4 does not show the lifting apparatus for the lifting tables 15C. But the lifting elements or lifting tables 15C and thus the belts 15A of the conveyor apparatus 15 for the change-over apparatus 11 can preferably be raised and lowered accordingly, as is the case in the transfer apparatus 9 so that reference is made to the description in this respect.

The conveyor direction of the cross conveyance by the conveyor apparatus 15 can preferably be changed in the change-over apparatus 11 in the same manner as for the transfer apparatus 9, the drive 15B can therefore operate in different directions in order to be able to convey or change the lens carriers 5 alternately or if necessary from the second transport track T2 to the third transport track T3 or vice versa.

As already mentioned, a change-over apparatus 11 and a transfer apparatus 9 or their conveyor apparatus 15 for cross conveyance can also be combined with one another or can form a unit or can be located in an extension to one another. In this case a lifting table 15C can be omitted. Furthermore the transfer apparatus 9 can then allow a change over the second or middle transport track T2 into the third transport track T3 or can form a change-over apparatus.

In the illustrated example the distance of the first and second transport track T1 and T2 is preferably greater than the distance of the second and third transport track T2 and T3. In this way the amount of space required by the processing apparatus 3 for accommodating and depositing lenses 2 on the respective conveyor apparatus 8 or a lens carrier 5 located thereon can be taken into account. In particular the processing apparatus 3 overlie or surround specifically the respectively assigned conveyor apparatus 8 at least in part, as is schematically indicated in the illustrated examples according to FIG. 1 and FIG. 5.

Preferably under the transport tracks T or conveyor apparatus 10 and/or transfer apparatus 9 there can also be storage apparatus or tanks or the like for the processing apparatus 3.

Further exemplary embodiments of the system 1 in accordance with the invention are explained below using the figures. In doing so important differences and new aspects are detailed so that statements and explanations so far apply especially accordingly or in a supplementary manner even if a repetition in this respect is omitted.

FIG. 5 shows in a schematic another exemplary embodiment of the system 1 in accordance with the invention. FIG. 5 illustrates that the system 1 in accordance with the invention can be enlarged—therefore expanded very easily by integration or incorporation of further processing apparatus 3. For example, further processing apparatus 3, here for example, another processing apparatus 3D for polishing and an additional processing apparatus 3G for coating have been subsequently (in FIG. 5 to the left thereof) incorporated here onto a processing or production line ending with the output [sic] station 6. The transfer system 4 has been extended or supplemented accordingly. The delivery station 6 can also be modified if necessary and for example, can be located at the end, as is indicated using the broken line by position 6'.

The system 1 in accordance with the invention allows optimized processing and use of often different processing capacities of the different processing apparatus 3. For example, lenses 2 or lens carriers 5 with lenses 2 can be conveyed alternately to the original processing apparatus 3D on the right side or to the other processing apparatus 3D on the left side, and conveyance via the third transport track T2 and if necessary return especially via the third transport track T3 can take place for example, for subsequent processing in the right-hand processing apparatus 3F.

According to an especially preferred aspect of this invention, circulation or circular conveyance K of the lenses 2 or lens carriers 5 can take place via the second transport track T2 in one direction and the third transport track T3 in the opposite direction. In particular circulation or circular conveyance K of the lenses 2 or lens carriers 5 is enabled or formed by corresponding cross connections or cross conveyances between the two transport tracks T2 and T3. This can enable in particular storage of lenses 2 or lens carriers 5 and/or can reduce or minimize the formation of unwanted congestion. In particular the lenses 2 and lens carriers 5 are extracted or conveyed as necessary and/or as available to desired processing apparatus 3. This takes place especially by corresponding cross conveyance and/or changing to the first transport track T1 or to one transfer apparatus 9 which is upstream of or assigned to the desired processing apparatus 3.

Corresponding circulation or circular conveyance K of lenses 2 or lens carriers 5 is preferably likewise possible or provided in the system 1 in accordance with the invention according to the other exemplary embodiment shown in FIG. 6 or according to the method in accordance with the invention.

FIG. 6 schematically shows that in the circulation or circular conveyance K several lens carriers 5 circulate or are conveyed in a circuit, for example, until the next or a desired processing apparatus 3 is ready to receive or deliver for suitable processing.

In the exemplary embodiment shown in FIG. 6, a system 1 originally built at least essentially in a straight line has been supplemented or expanded, the expansion section preferably running angled. The system 1 and the transport tracks T here therefore have especially an L-shape. As already mentioned, however also other especially polygonal arrangements or even an at least essentially solely straight-line arrangement or other arrangements are possible, in particular depending on structural circumstances. In the illustrated example the original system 1 with the original processing apparatus 3A, 3B, 3C, 3D, 3F and 3G (at the top in FIG. 6) has been supplemented or expanded for example, by additional processing apparatus 3C, 3D and 3E (on the left side in FIG. 6).

The transfer system 4 is expanded in the illustrated example preferably via connecting apparatus 22, especially corresponding extensions, turns, corner connectors and/or the like, especially preferably in order to connect further conveyor apparatus 10 and/or transfer apparatus 9 or the like and/or in order to extend the first, second and/or third transport track T or the like. Especially preferably the transport tracks T2 and T3 or the possible or preferred circular conveyance K are lengthened accordingly. In the illustrated example originally the circular conveyance K and transport tracks T ended in the region of the delivery station 6. Only the expansion led to the L-shaped structure which is shown by way of example here.

The necessary additional transfer apparatus 9 or conveyor apparatus 10 and/or change-over apparatus 11 when the transfer system 4 is supplemented are connected preferably directly to the bus system 13. Accordingly the cost for the enlargement can be minimized, therefore an expansion can take place very easily.

As already mentioned, preferably independent control of the transfer system 4 on the one hand and of the conveyor apparatus 8 of the processing apparatus 3 on the other takes place. It is preferably provided that the transfer apparatus 9, conveyor apparatus 10 and/or change-over apparatus 11 are controlled by the preferably central transfer control apparatus 12, especially a memory-programmable control and/or via the bus system 13 and that the conveyor apparatus 8 of the processing apparatus 3 are controlled by the respective processing apparatus 3 or its machine control 20. In particular the transfer system 4 is controlled altogether by the control apparatus 12. This allows an optimum sequence and/or very durable, less fault-susceptible control. Furthermore this facilitates an expansion of the system 1.

In the illustrated example individual, several or all processing apparatus 3 or their machine controls 20 are connected preferably to the central system control 21, for example, via a data network, a (further) bus system 25, Ethernet cabling or the like. The system control 21 can be a server, a database system or the like. The system control 21 manages in particular the jobs to be handled by the system 1 or the lenses 2 to be processed/machined by the system 1 and the information necessary for the processing, for example, processing data, processing plans or processing sequences, processing statuses, scheduled or necessary processing steps, optical and/or geometric information or data of the lenses 2 and/or other information, for example, about tools which are to be used or which are available or the like.

Preferably the transfer control or control apparatus 12 on the one hand and the system control 21 on the other are coupled to one another for information or data exchange, as is schematically indicated in FIG. 6.

Preferably the system control 21 can control the transfer system 4 or the transfer apparatus 9, conveyor apparatus 10 and/or change-over apparatus 11, especially via the control apparatus 12 such that desired lenses 2 or lens carriers 5 are conveyed to the respective processing apparatus 3, if necessary only on the corresponding request of the respective processing apparatus 3.

In particular, different or all processing equipment 3 can individually request or retrieve work orders or lenses 2 to be processed/machined or lens carriers 5 with lenses 2 to be processed/machined automatically from the transfer system 4, can carry out the necessary processing and again steer the lens 2 after processing back to the transfer system 4 or can transfer the lens to it.

The lenses 2 for processing/machining can be retrieved or requested by several or optionally all processing apparatus 3, therefore preferably independently or automatically. In particular a processing apparatus 3 can ascertain automatically, especially with consideration of a processing plan and the processing status (these processing data or this information are interrogated or made available especially by the system control 21 or a database, a data storage or the like), whether a lens 2 (which is located especially in the vicinity or shortly upstream from the processing apparatus 3) is suitable for processing/machining in the respective processing apparatus 3 in order to have the lens or corresponding lens carrier 5 requested or delivered at a corresponding capacity of the processing apparatus 3.

In particular therefore several processing apparatus 3 for the same processing/machining can choose and/or request a lens 2 for the next processing/machining operation independently of one another. In the illustrated example the request takes place by a processing apparatus 3 especially when it has been cleared. But if necessary the request can also take place beforehand to minimize waiting times. Then in the interim the next lens 2 to be processed/machined or the corresponding lens carrier 5 can already be en route to the transfer apparatus 4 located upstream of the processing apparatus 3 or can be accepted by the transfer apparatus and can wait there until the processing apparatus 3 is ready to accommodate the next lens 2 or the next lens carrier 5.

Preferably the respective processing apparatus 3 outputs corresponding information or a corresponding signal to the control apparatus 12 when a lens 2 or a lens carrier 5 after processing/machining is to be or already has been delivered to the downstream transfer apparatus 9 or to the transfer system 4. Depending on the capacity then the respective lens 2 or the respective lens carrier 5 is received by the transfer system 4 or the transfer apparatus 9 downstream of the respective processing apparatus 3, for example, is injected again into the receiving area 19, and/or continues to be conveyed, for example, to a downstream processing apparatus 3 and/or into the second transport track T2 or the circular conveyance K. This can take place alternately by the transfer system 4 or its control apparatus 12 automatically and/or in coordination and/or depending on the system control 21.

Furthermore a lens 2 or lens carrier 5 is again delivered to the processing apparatus 3 which is ready to accommodate a lens 2 or lens carrier 5, the choice, as already mentioned, taking place especially preferably by the respective processing apparatus 3 or its machine control 20 and/or by the system control 21, especially preferably with consideration of data relevant to the processing, such as the processing plan and processing state, especially from the system control 21. Delivery is then controlled preferably via the control apparatus 12, but if necessary can also be controlled by the respective processing apparatus 3 or its machine control 20, as detailed below using another exemplary embodiment according to FIG. 7.

Alternatively or in addition the respective processing apparatus 3 has priority for example, over a downstream or upstream processing apparatus 3 and/or over the transfer control or control apparatus 12 in the delivery and removal of lenses 2 or lens carriers 5 or in the triggering of the upstream and/or downstream transfer apparatus 9 or conveyor apparatus 14.

Especially preferably a processing apparatus 3 or its conveyor apparatus 8 after processing transfers a lens 2 or lens carrier 5 to the transfer system 4 or to a transfer apparatus 9 which is preferably downstream in the conveyor direction F1, if or as soon as there is room there for acceptance, especially when the respective or assigned receiving area 19 is free. To do this the processing apparatus 3 or its machine control 20 communicates preferably via the system control 21 or directly with the transfer control or control apparatus 12 or the transfer system 4 or the respective transfer apparatus 9.

After the processing apparatus 3 or its conveyor apparatus 8 clears, it can again accept the next lens 2 or the next lens carrier 5. Delivery takes place especially via the transfer system 4 or the upstream transfer apparatus 9. Delivery is triggered preferably by a request of the respective processing apparatus 3 or by the system control 21 when it recognizes or has been notified that the processing apparatus 3 or its conveyor apparatus 8 has cleared.

It should be noted that the conveyor apparatus 8 of the processing apparatus 3 can also accept in particular several lenses 2 or lens carriers 5 with lenses 2 if necessary (at the same time). The term "clearing" should then be accordingly understood as the respective processing apparatus 3 or its conveyor apparatus 8 being ready to accept a lens 2 or lens carrier 5, even if one or more lenses 2 or lens carriers 5 are still in the processing apparatus 3 or its conveyor apparatus 8.

As already mentioned, in the illustrated example delivery can take place especially alternately from the receiving area 19 of an upstream transfer apparatus 9 or by cross conveyance via the transfer apparatus 15 and subsequent longitudinal conveyance via the conveyor apparatus 14 of the upstream transfer apparatus 9, therefore by delivery from the second transport track T2. Preferably the control apparatus 12 and/or the request of the respective processing apparatus 3 and/or a prioritization of processing operations or lenses 2 by the system control 21 controls the sequence.

The lens 2 which is already being processed/machined beforehand by the processing apparatus 3 or the lens carrier 5 which bears it can be accommodated by the downstream transfer apparatus 9 and if necessary can be stored on an interim basis in the receiving area 19. But continued conveyance without stopping can also optionally take place directly if necessary.

The continued conveyance can consist in that the lens 2 or lens carrier 5 continues to be conveyed to the next processing apparatus 3, therefore in the conveyor direction F1 onward along the first transport track T1, therefore it is delivered to the next processing apparatus 3 or its transfer apparatus 8. Alternatively cross conveyance can also take place by means of the conveyor apparatus 15 and changeover to the second transport track T2 and optionally further to the third transport track T3 can take place. Thus continued conveyance to another processing apparatus 3 or optionally to the delivery station 6 can then take place.

Preferably continued conveyance takes place via the second and/or third transport track T2, T3 when delivery to another processing apparatus 3 is desired or necessary, for example, due to the failure of a processing apparatus 3 or different equipment or different tools of the processing apparatus 3, or for example, due to a desired or necessary processing sequence or a desired or necessary processing progression.

FIG. 7 shows in a schematic another exemplary embodiment of the system 1 in accordance with the invention. Preferably individual, several or all transfer apparatus 9 have in addition a conveyor apparatus 15' for cross conveyance in addition to the respective conveyor apparatus 15 for cross conveyance. Both conveyor apparatus 15 and 15' of a transfer apparatus 9 can preferably be operated independently of one another. This makes it possible for the respective processing apparatus 3 to control the upstream cross conveyance via the upstream conveyor apparatus 15 and the downstream conveyance via the downstream conveyor apparatus 15' directly or automatically, especially independently of the transfer control or control apparatus 12 which is not shown in FIG. 7. Thus the automatic extraction of lenses 2 or lens carriers 5 from circulation or circular conveyance K and/or automatic return or re-injection of lenses 2 or lens carriers 5 into circulation or circular conveyance K by the respective processing apparatus 3 or its machine control 20 is enabled. For the processing apparatus 3C and 3D it is indicated therefore for example, in FIG. 7 that the respective machine control 20 is connected to the assigned conveyor apparatus 15 and 15'.

The assigned or in-between conveyor apparatus 14 is optionally provided, can therefore also be omitted, and is preferably controlled by the upstream or downstream processing apparatus 3 or its machine control 20.

Alternatively or in addition, especially preferably detection of lenses 2 or lens carriers 5 is enabled via especially sensors 16 likewise connected to the machine control 20. It is possible for example, by means of the sensors 16 to identify lenses 2 or lens carriers 5 which are in the transport track T2 or circulation or circular conveyance K and to extract lenses 2 or lens carriers 5 which are suitable for processing in the respective processing apparatus 3 or have them changed over to the first transport track T2, especially independently of other processing apparatus 3 or their machine control 20 and/or independently of the transfer control or control apparatus 12 and/or independently of the system control 21.

The machine control 20 is assigned preferably to the respective processing apparatus 3 or are arranged in it, but can also be located separately from it or centrally.

Figure 8:
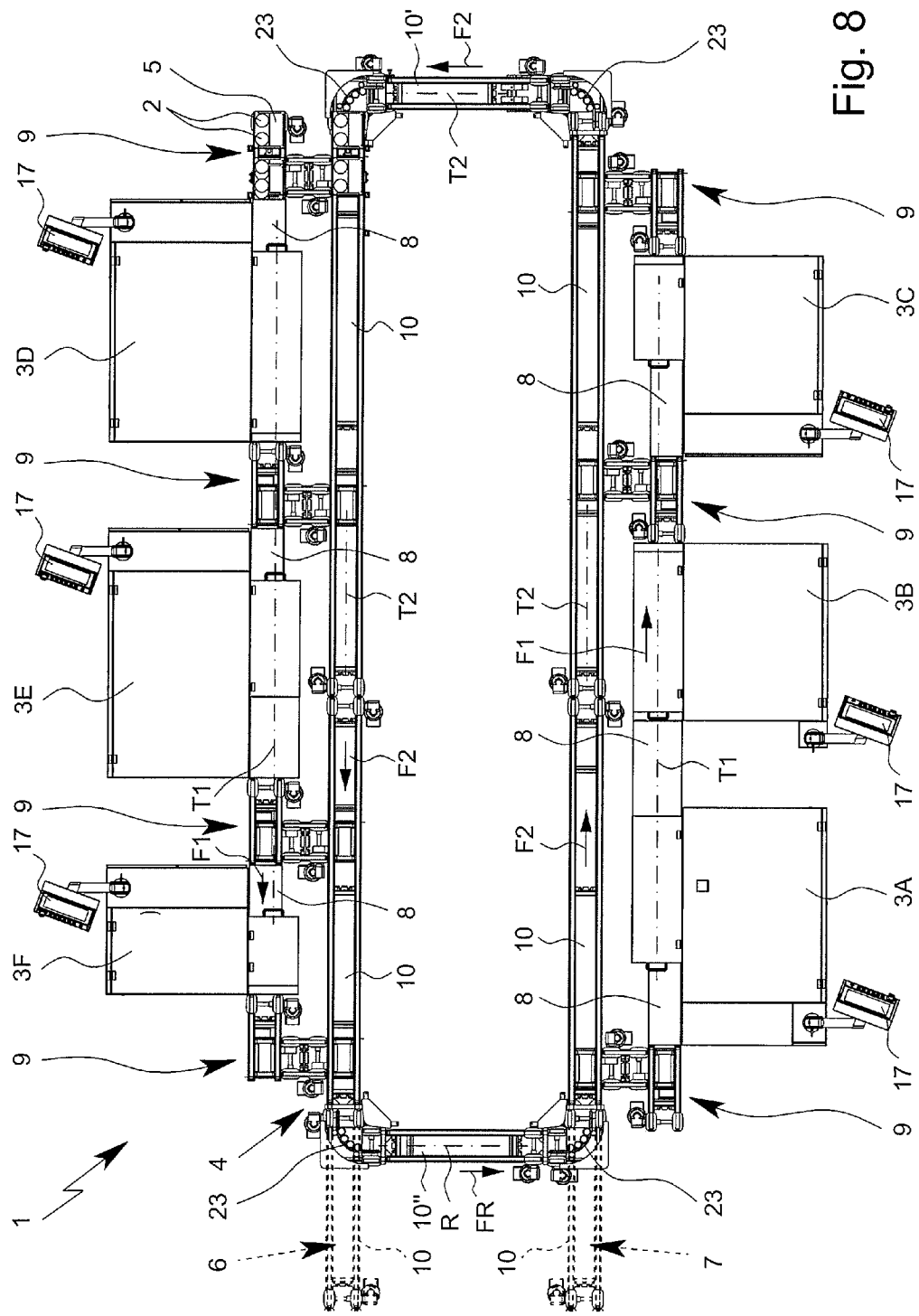
FIG. 8 is a schematic representation of the system in accordance with the invention according to a further exemplary embodiment.

FIG. 8 schematically shows another exemplary embodiment of the system 1 in accordance with the invention. In this exemplary embodiment, preferably an at least essentially U-shaped arrangement, especially of the first or second transport track T1 or T2, is formed.

Preferably, two groups or rows of processing apparatus 3, here, for example, a first group of processing apparatus 3A, 3B and 3C and a second group of processing apparatus 3D, 3E, and 3F are formed or arranged opposite one another and/or with conveyor apparatus 8 which are arranged on facing sides and/or are arranged such that the assigned transport tracks T1 and/or T2 of the two groups run preferably parallel to one another.

Preferably, the system 1 or the transfer system 4 has a cross connection of the two groups of processing apparatus 3 via a conveyor apparatus 10' and/or 10" connected transversely or to one another.

Preferably, the conveyor apparatus 10' forms one leg or section of the preferably at least essentially U-shaped arrangement or one part of the preferably essentially U-shaped path of the first or second transport track T1 or T2, here of the second transport track T2. If necessary there can also be one or more processing apparatus 3 on this section.

Preferably, the system 1 or the transfer system 4 has a return conveyor connection R.

Preferably, the return conveyor connection R has the (second) conveyor apparatus 10" or is formed by it.

Preferably, in the illustrated exemplary embodiment, circular conveyance or circulation is possible, especially preferably, via the first or second transport track T1 or T2. In the exemplary embodiment, for this purpose, there is the return conveyor connection R for the first or second transport track T1 or T2 (in the illustrated example only for the second transport track T2). Here, the return conveyor connection R enables return in the return conveyor direction FR so that circular conveyance or circulation of the lenses 2 or lens carriers 5 via the second transport track T2 is enabled without reversing the conveyor direction F2 and without changing to the opposite conveyor direction F3.

In the illustrated exemplary embodiment, the system 1 or the transfer system 4 preferably has a receiving station 7 and/or delivery station 6 or corresponding conveyor apparatus 10 (indicated in FIG. 8 by the broken line on the left side) as an inlet and/or outlet distance for lenses 2 or lens carriers 5.

The return conveyor connection R or conveyor apparatus 10" is especially preferably located in the region of the start and/or end of the transport track T1 or T2 and/or of the conventional processing and/or in the region of the receiving station 7 or delivery station 6. Especially preferably the return conveyor connection R or conveyor apparatus 10" is connected via corresponding shunts. But other designs and/or or arrangements are also possible, especially depending on the location and execution or arrangement of the receiving station 7 and/or delivery station 6.

In the exemplary embodiment according to FIG. 8, the return conveyor connection R allows circular conveyance or circulation of the lenses 2 or lens carriers 5. Accordingly, a third transport track T3 for return or circulation is not necessary, but the return conveyor connection R and the third transport track T3 can, if necessary, also be combined or used in a supplementary manner, especially depending on structural circumstances and/or existing processing apparatus 3.

The return conveyor connection R can, if necessary, also be located elsewhere or can form only one circuit for some of the processing apparatus 3, for example, can be connected, on the one hand, between the processing apparatus 3B, 3C, and on the other hand, between the processing apparatus 3D, 3E, as necessary can therefore also enable a shorter or smaller circuit.

If necessary, there can also be several such cross connections or return conveyor connections R. In this way, if necessary, additional storage lengths can also be formed.

Preferably, the system 1 or the transfer system 4 has conveyor apparatus 23 for curved conveyance, especially to connect straight sections of the respective transport track, here, T2, and/or different conveyor apparatus 10, 10' and/or 10" and/or the return conveyor connection R to the transport track T2. The curved conveyance can result in that the alignment of the lenses 2 or lens carriers 5 with regard to the respective conveyor direction F remains the same, therefore for example, in a lens carrier 5 with two lenses 2 the same lens 2 is always forward.

The two groups of processing apparatus 3 or the two legs of the especially preferably U-shaped arrangement in the illustrated example are preferably relatively close together and/or are spaced such that the intermediate space forms an access possibility for an operator who is not shown. In particular, to do this, the cross connections or conveyor apparatus 10' and/or 10" are made such that they can if necessary be detached or opened or folded away. Alternatively or in addition, they can also be placed higher or lower, and for example, can be connected via corresponding vertical conveyors or gradient distances so that preferably free access to the intermediate space is enabled.

Alternatively or in addition, the intermediate space can also be used for consumable tanks for processing apparatus 3, for example, for a coolant tank, a tank for shavings, a tank for cooling liquid or the like. The tanks can especially be located in the intermediate space and/or underneath the transfer system, especially preferably underneath the second transport track T2.

Figure 9:
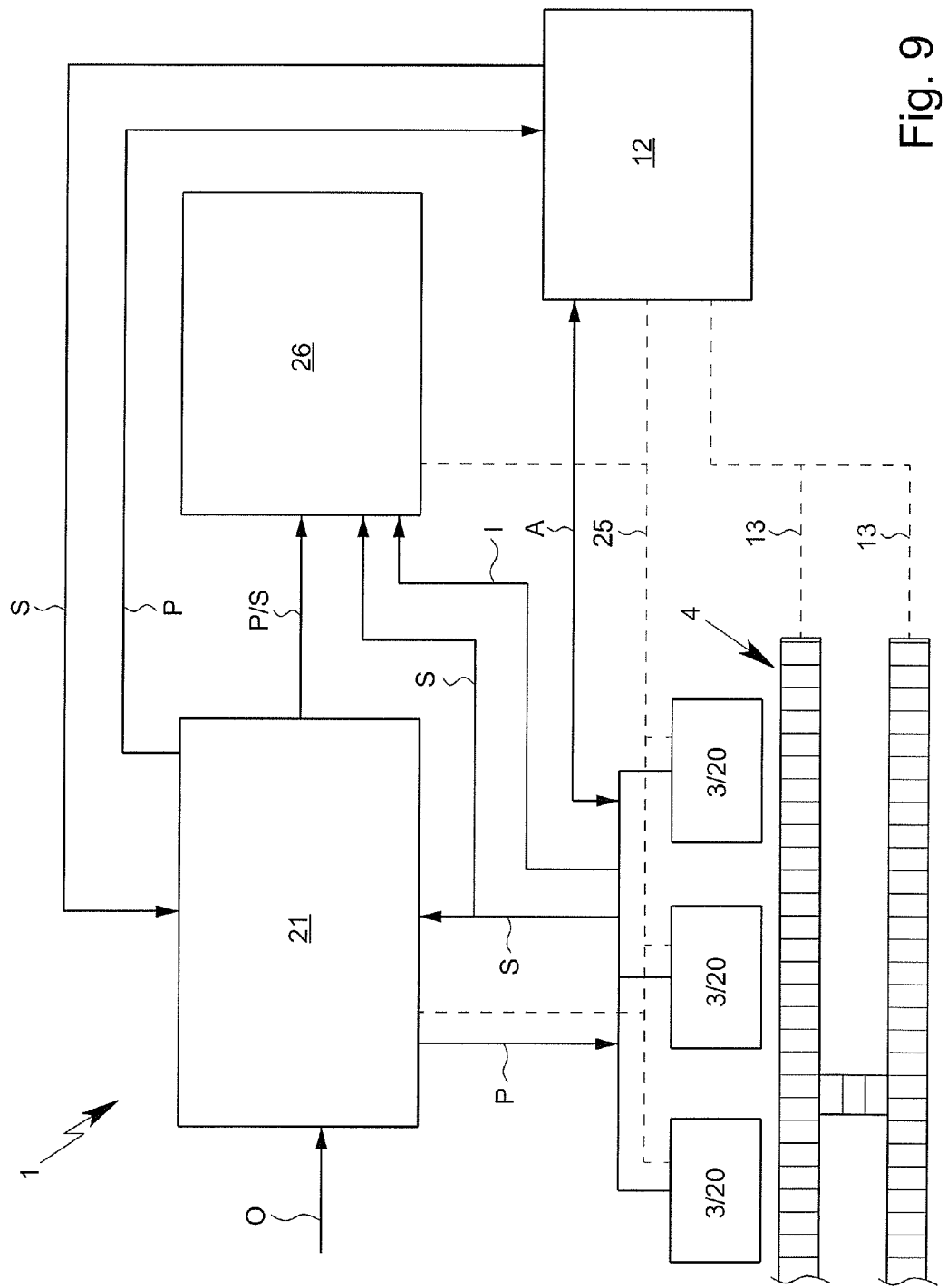
FIG. 9 is a schematic block diagram of a preferred control structure of a system in accordance with the invention.

FIG. 9 schematically shows a block diagram of a preferred control structure of a system 1 in accordance with the invention.

As already mentioned, the system 1 or the transfer system 4 preferably has an especially central transfer or control apparatus 12. It is especially a so-called belt supervisory computer. If necessary it can also be a program and/or several networked computers, data processing systems, controls or the like.

The transfer or control apparatus 12 is used especially to control the production flows or conveyance of the lenses 2 or lens carriers 5, such as the circulation or circular conveyance and/or conveyance of lenses 2 or lens carriers 5 to the processing apparatus 3 and away from them.

Especially preferably, the control apparatus 12 controls the transfer apparatus 9, conveyor apparatus 10 and/or change-over apparatus 11, conveyor apparatus 14 for longitudinal conveyance, conveyor apparatus 15 for cross conveyance and/or stopping apparatus 18, and the transfer apparatus 9 preferably can also be (directly) controlled in addition or alternatively by the processing apparatus 3 or their machine control 20 especially when connected to the bus system 13.

The system control 21 is preferably coupled or connected to the processing apparatus 3 or their machine controls 20 via a (further) bus system 25. But, other types of connection are also possible.

The control apparatus 12 can be connected to the system control 21 likewise via the bus system 25 or a separate connection for data exchange.

The system control 21 preferably forms a lens management system.

The system control 21 is used especially to accept or acquire jobs O and/or for management of jobs, production data and/or lens blanks and/or to make available interfaces to other system, for example, to systems or modules for lens design which in particular depending on desired optical properties determine the desired geometrical configuration of lenses 2 and/or the necessary processing or processing steps.

In particular, production data P which contain especially processing plans (processing steps and/or sequences or orders) and processing statuses (processing states or information on processing to be performed next) are managed and/or generated in the system control 21 (or some other server or data storage).

The production data P are made available especially by the system control 21 to the processing apparatus 3 or their machine controls 20 and/or can be interrogated by them, as schematically indicated by a corresponding arrow in FIG. 9.

The status of the processing apparatus 3, especially the processing status or production status, the availability of the respective processing apparatus 3, the tool equipment, the possible processing operations and/or other similar information are transferred as status information S from the processing apparatus 3 or their machine control 20 especially to the system control 21, as indicated by a corresponding arrow in FIG. 9, and/or to a system 26 for display and/or management.

The system 26 is used especially for visualization and/or management of machine states, therefore states of the processing apparatus 3, production data, process data and/or other information.

Furthermore, the system 26 is used preferably to manage macros and/or reporting.

The system 26 can comprise corresponding programs, applications or the like and/or one or more computers, such as a server or the like. The corresponding also applies to the system control 21 and/or control apparatus 12.

The processing apparatus 3 or their machine controls 20 can preferably furthermore communicate information I such as process data and the like, to the system 26, as indicated by a corresponding arrow in FIG. 9.

For information or data exchange the system 26 can also be connected to the bus system 25. Alternatively or in addition the data exchange can also take place via the system control 21.

Preferably, the system control 21 and the system 26 can exchange production data P and/or data, status information S, for example, on the job status, as indicated by the arrow P/S in FIG. 9.

Preferably, the system control 21 and the control apparatus 12 can exchange and/or balance production data P, as indicated by a corresponding arrow in FIG. 9, and/or status information S, especially data on the job status, as indicated by a corresponding arrow A in FIG. 9.

For data exchange, the control apparatus 12 is preferably also connected to the further bus system 25 and/or in some other way or is connected or can be connected for data exchange.

Preferably, the processing apparatus 3 or their machine controls 20 can exchange job information A, such as information on the status, especially job status, inquiries and/or requests, as indicated by a corresponding arrow in FIG. 9. Especially preferably, inquiries and job information A can be transferred to the control apparatus 12 or communicated to it and/or a request for a lens 2 or a lens carrier 5 can be transferred to the control apparatus 12. Alternatively or in addition, information about lenses 2 or lens carriers 5 which have been identified or detected preferably by the sensors 16 can be transferred directly or via control apparatus 12 to one, several or all processing apparatus 3 or their machine control 20 or can be made available to them. This information is exchanged especially within the framework of the request for new lenses 2 or lens carriers 5 by the processing apparatus 3, as is indicated by the double arrow A in FIG. 9. This information exchange can also take place with consideration of other data or information, especially process data, especially preferably processing plans and processing statuses which are made available preferably by the system control 21.

In particular, the processing apparatus 3 can preferably independently select and/or request new jobs or lenses 2 for processing. According to one especially preferred aspect, this enables more or less optional or independent incorporation of processing apparatus 3 into the system 1.

The system 1 in accordance with the invention and the method in accordance with the invention for processing of optical lenses 2 is very flexible. In particular, improved or optimized use of processing/machining capacities can be achieved. Furthermore very flexible processing and adaptation to different circumstances are enabled. For example, downtimes or failures of individual processing apparatus 3 can be very easily and/or optimally compensated, in particular if other or alternative processing apparatus 3 are available. Alternatively or in addition, intelligent focal control can take place, for example, such that a processing apparatus 3 which is especially suitable for certain processing is being used primarily for this processing, therefore, for example, a lathe with an especially large chip space for processing of lenses 2 which produce especially long and bulky shavings during processing.

The system 1 in accordance with the invention and the method in accordance with the invention allow, in particular, very high flexibility even in the processing of lenses 2 with different shapes and/or of different materials. In particular the previously conventional processing lines or production lines which are designed primarily for processing of lenses 2 from a certain material or of lenses 2 of a certain shape can be avoided.

Furthermore, the system 1 in accordance with the invention and the method in accordance with the invention enable especially good use of available tools or other consumables.

Individual aspects and features of the system 1 in accordance with the invention and the described sequences and different exemplary embodiments can also be implemented independently of one another, but also in any combination.

What is claimed is:

1. A system for processing optical lenses, comprising:
several separate processing apparatus for independent processing of the lenses and
a transfer system for conveyance of the lenses to and from the several separate processing apparatus,
wherein each processing apparatus has a conveyor apparatus for conveyance of the lenses,
wherein the transfer system has a first transport track for conveyance of the lenses from one of the several separate processing apparatus to a next one of the several separate processing apparatus and a second parallel transport track for parallel conveyance of the lenses,
wherein the transfer system has a transfer apparatus located between each of the several separate processing apparatus for receiving and temporary intermediate storage in a receiving area and for continued conveyance of at least one lens selectively to the conveyor apparatus of a following processing apparatus of the several separate processing apparatus or to the second parallel transport track, the transfer apparatus and the conveyor apparatus of the several separate processing apparatus forming the first transport track, wherein the transfer apparatus each have a conveyor apparatus for longitudinal conveyance of at least one lens in the direction of the first transport track and a conveyor apparatus for transport track change of at least one lens, wherein each of the transfer apparatus has a stopping apparatus for stopping at least one lens in the receiving area, the receiving area being formed by the conveyor apparatus for longitudinal conveyance in order to temporary store a lens upstream of the conveyor apparatus for transport track change.

2. The system as claimed in claim 1, the conveyor apparatus for longitudinal conveyance of at least one lens parallel to one of the transport tracks and a cross conveyance conveyor apparatus for cross conveyance of at least one lens.

3. The system as claimed in claim 2, wherein one of the conveyor apparatus for longitudinal conveyance and the cross conveyance conveyor apparatus for cross conveyance are controllable independently of one another.

4. The system as claimed in claim 2, wherein the conveyor apparatus for longitudinal conveyance forms or has the receiving area of the respective transfer apparatus.

5. The system as claimed in claim 2, wherein the receiving area is located upstream of the cross conveyance conveyor apparatus for cross conveyance to the respective transfer apparatus.

6. The system as claimed in claim 2, wherein the conveyor apparatus for longitudinal conveyance is integrated into the first transport track and that the cross conveyance conveyor apparatus for cross conveyance is adapted for changing between the first and second transport track and vice versa.

7. The system as claimed in claim 2, wherein the cross conveyance conveyor apparatus for cross conveyance has reversible conveying direction for cross conveyance.

8. The system as claimed in claim 1, wherein a lens is at least one of receivable and intermediately storable in the receiving area of the transfer apparatus for enabling another lens to be conveyed by means of one of the transfer apparatus from the second transport track to at least one of the conveyor apparatus for longitudinal conveyance and processing apparatus downstream of the one of the transfer apparatus.

9. The system as claimed in claim 1, wherein each transfer apparatus forms a shunt.

10. The system as claimed in claim 1, wherein a sensor for at least one of detection and identification of lenses is assigned to the receiving area.

11. The system as claimed in claim 1, wherein each transfer apparatus has a stopping apparatus for stopping at least one lens in the receiving area.

12. The system as claimed in claim 1, wherein the transfer apparatus has at least one of a respective stopping apparatus for stopping a lens in the second transport track and a respective sensor for at least one of detection and identification of a lens in the second transport track.

13. The system as claimed in claim 1, further comprising a control apparatus for controlling the transfer apparatus, the conveyor apparatus of the processing apparatus being controllable by the respective processing apparatus independently of one another and independently of the transfer apparatus.

14. The system as claimed in claim 1, wherein the transfer apparatus is controllable by at least one of the successive processing apparatus depending on detected lenses and the previous processing apparatus.

15. The system as claimed in claim 1, wherein the first transport track runs in a straight line through the several separate processing apparatus.

16. The system as claimed in claim 1, wherein the transfer system has several change-over apparatus with conveyor apparatus for cross conveyance of at least one lens for changing between transport tracks.

17. The system as claimed in claim 1, wherein each transport track is comprised of several conveyor apparatus for linear conveyance of lenses.

18. The system as claimed in claim 1, wherein at least one of the first transport track and the conveyor apparatus for transport track change of at least one lens is able to be controlled independently of one another.

19. The system as claimed in claim 1, wherein the conveyor apparatus of the several separate processing apparatus are belt conveyors.

20. The system as claimed in claim 1, wherein at least one of the first and second transport tracks run at least essentially in a U-shape.

21. The system as claimed in claim 1, wherein the transfer apparatus and the conveyor apparatus of the several separate processing apparatus are independently controllable or drivable for independent conveyance.

22. The system for processing optical lenses according to claim 1, wherein the several processing apparatus are operable independently of one another and the transfer apparatus via a partially decentralized control by which individual processing operations in an individual processing apparatus has priority and the transfer apparatus conveying the lenses or lens carriers to or from the processing apparatus only as necessary based on an automatic request from the processing apparatus independently of other processing apparatus, thereby providing the system with an expansible modular construction.

23. A system for processing optical lenses, comprising:
several separate processing apparatus for independent processing of the lenses and a transfer system for conveyance of the lenses to and from the several separate processing apparatus,
wherein each of the several separate processing apparatus has a conveyor apparatus for conveyance of the lenses,
wherein the transfer system has a first transport track for conveyance of the lenses from one of the several separate processing apparatus to a next one of the several separate processing apparatus and a second parallel transport track for parallel conveyance of the lenses,
wherein the transfer system has a transfer apparatus located between each of the of the several separate processing apparatus for changing the lenses between the first and second transport track, the transfer apparatus and the conveying apparatus of the several separate processing apparatus forming the first continuous transport track.

24. The system as claimed in claim 23, wherein the return conveyor connection is connected via corresponding shunts.

25. The system as claimed in claim 23, wherein the system comprises several return conveyor connections.

26. The system as claimed in claim 23, wherein the return conveyor connection is positioned to connect with the first or second transport track.

27. The system as claimed in claim 23, wherein the return conveyor connection is configured to enable the return of lenses in a return direction so that conveyance or circulation of the lenses via the second transport track is enabled without reversing the conveyor direction and without changing to the opposite conveyor direction.

28. The system as claimed in claim 23, wherein the several separate processing apparatus comprise two groups of processing apparatus arranged at least one of parallel to one another, opposite one another and with conveyor apparatus arranged on facing sides.

29. The system as claimed in claim 28, wherein the two groups of processing apparatus have transport tracks that are arranged parallel to one another.

30. The system as claimed in claim 28, wherein the system comprises a connecting conveyor apparatus connecting the two groups of processing apparatus transversely or to one another.

31. The system as claimed in claim 30, wherein the return conveyor connection comprises the connecting conveyor apparatus or is formed by the connecting conveyor apparatus.

32. The system as claimed in claim 30, wherein a second transport track parallel to the first transport track is positioned to connect with each group of the two groups of processing apparatus.

33. The system as claimed in claim 32, wherein the return conveyor connection connects the second transport tracks of the two groups of processing apparatus to one another.

34. The system as claimed in claim 32, wherein the second transport tracks and the return conveyor connection are arranged or connected to each other such that the lenses are circulated between the two groups of processing apparatus.

35. The system as claimed in claim 33, wherein a first transport track is positioned to connect with each group of processing apparatus for conveyance of lenses from one of the several separate processing apparatus to a next of said several separate processing apparatus within one of the two groups of processing apparatus.

36. The system as claimed in claim 35, wherein the conveyor apparatus is able to selectively raised and lowered for cross conveyance.

* * * * *